US012565603B2

(12) United States Patent
Nishikawa

(10) Patent No.: US 12,565,603 B2
(45) Date of Patent: Mar. 3, 2026

(54) MANUFACTURING METHOD OF HALF-CUT DOUBLE-SIDED TAPE AND HALF-CUT DOUBLE-SIDED TAPE STICKING DEVICE

(71) Applicant: Yoshihide Nishikawa, Osaka (JP)

(72) Inventor: Yoshihide Nishikawa, Osaka (JP)

( * ) Notice: Subject to any disclaimer, the term of this patent is extended or adjusted under 35 U.S.C. 154(b) by 0 days.

(21) Appl. No.: 18/796,963

(22) Filed: Aug. 7, 2024

(65) Prior Publication Data

US 2024/0392169 A1 Nov. 28, 2024

Related U.S. Application Data

(62) Division of application No. 17/636,685, filed as application No. PCT/JP2020/031112 on Aug. 18, 2020, now Pat. No. 12,077,696.

(30) Foreign Application Priority Data

Aug. 20, 2019 (JP) ................................. 2019-150526
Dec. 10, 2019 (WO) .................. PCT/JP2019/048291
May 22, 2020 (WO) .................. PCT/JP2020/020256

(51) Int. Cl.
*B29C 64/00* (2017.01)
*C09J 7/40* (2018.01)

(52) U.S. Cl.
CPC ....... *C09J 7/405* (2018.01); *C09J 2301/1242* (2020.08); *C09J 2400/28* (2013.01)

(58) Field of Classification Search
CPC ...................................................... C09J 7/405
See application file for complete search history.

(56) References Cited

U.S. PATENT DOCUMENTS

2010/0212586 A1 8/2010 Sasaki
2010/0224637 A1 9/2010 Ikeda
(Continued)

FOREIGN PATENT DOCUMENTS

JP S59-091176 5/1984
JP 2003-013013 1/2003
(Continued)

OTHER PUBLICATIONS

International Search Report of PCT/JP2020/031112, mailed on Oct. 27, 2020, 7 pages including English translation.
(Continued)

*Primary Examiner* — Nicholas Krasnow
(74) *Attorney, Agent, or Firm* — HSML P.C.

(57) ABSTRACT
To provide a half-cut double-sided tape from a double-sided tape with a release-liner by means of a simple process without contacting a cutter blade directly to an adhesive layer when making the half cuts in the half-cut process. A processing protection layer formation step of feeding a protect release paper tape having the release surface to the double-sided tape to form a processing protection layer on the double-sided tape with the release liner; a half-cut step of continuously performing half-cut together with the processing protection layer and the double-sided tape on the release liner while leaving only the release liner, and making a number of the double-sided tape pieces of proper length are held on the release liner; a half-cut double-sided tape winding step of winding the half-cut double-sided tape with the release liner while peeling off the processing protection layer. A cut trace has a fully cut region in the width direction of the double-sided tape on the release liner and a non-cut region in the width direction of the protect release paper tape, so that the peeling is facilitated.

13 Claims, 14 Drawing Sheets

(56)     References Cited

U.S. PATENT DOCUMENTS

| | | | |
|---|---|---|---|
| 2012/0085478 | A1 | 4/2012 | Yamamoto |
| 2012/0085488 | A1 | 4/2012 | Yamamoto |
| 2014/0210935 | A1 | 7/2014 | Norimatsu |
| 2015/0034370 | A1 | 2/2015 | Yu |
| 2016/0297083 | A1 | 10/2016 | Ogino |
| 2021/0008909 | A1 | 1/2021 | Terada |

FOREIGN PATENT DOCUMENTS

| | | |
|---|---|---|
| JP | 2006-052256 | 2/2006 |
| JP | 2010-023131 | 2/2010 |
| JP | 2014-094995 | 5/2014 |
| JP | 2016-008262 | 1/2016 |
| JP | 2016-082166 | 5/2016 |

OTHER PUBLICATIONS

International Preliminary Report on Patentability (Chapter II) of PCT/JP2020/031112, mailed on May 18, 2021, 4 pages.

(a)

(b)

(a)

100A (b)

100A (c)

100A (b) Steering mechanism of rotational sticking rolling part 420

(c) Suspension mechanism of rotational sticking rolling part 420

(a)

Steering mechanism of rotational sticking rolling part 420 installed to the entire robot arm 440

(b)   Steering mechanism of rotational sticking rolling part 420 installed to the entire robot arm 440

Top view (a)

(b)

(a)

(b)

(a)

(b)

Both end of the edge of the
half-cut double-sided tape
100A is rubbed, and neatly
arranged by the non-turning
rolling body 523.

(a)

(b)

The stuck half-cut
double-sided tape 100A is
smoothed, and neatly
arranged by the smoothing
roller 524.

(a)

(b)

(c)

Conventional manufacturing method shown in Prior art JP2016-008682

MANUFACTURING METHOD OF HALF-CUT DOUBLE-SIDED TAPE AND HALF-CUT DOUBLE-SIDED TAPE STICKING DEVICE

TECHNICAL FIELD

The present invention relates to a method of manufacturing half-cut double-sided tape and a half-cut double-sided tape sticking device.

In a general double-sided tape, a tape, in which a base material and an adhesive layer provided on both surfaces of the base material are integrated in a belt shape is continuous without a break, with the surface supported by the release paper before use. The "half-cut double-sided tape" is in a state in which the double-sided tape is properly cut, and the surface is in a state of being supported by the release paper before used.

BACKGROUND TECHNOLOGY

In a conventional double-sided tape in the prior art, an adhesive layer is provided on both surfaces of a base material layer, and it is wound in a roll shape while being supported by a release liner before use. If the release agent is applied to both surfaces of the release liner, the release liner may be one sheet, and the release liner may be wound in the roll shape. In a general market, it is provided in a state of being wound in such a roll shape.

The double-sided tape is used by being interposed between the sticking object place and the sticking object. When the double-sided tape is stuck and used, the double-sided tape is delivered and cut to the length necessary for sticking, and after the double-sided tape is stuck to the sticking object place from the adhesive layer on the side not covered with the release liner, the release liner is peeled off, and the sticking object can be stuck to the adhesive layer appearing on the surface side.

Here, when the industrial use of the double-sided tape is considered, the conventional general double-sided tape is continuous in the length direction, so the cutting step and the peeling step of the release liner are required, and it is difficult to mechanically control the double-sided tape.

A "half-cut double-sided tape" is known as a special double-sided tape in the prior art (for example, JP2016-008262). The half-cut double-sided tape has a strip-like shape in which a double-sided tape is appropriately cut continuously in a row, and the surface of the double-sided tape is supported by the release liner before the use of the double-sided tape. That is, the double-sided tape part is cut into a large number in the width direction to form a strip shape, and the double-sided tape is held on the release liner surface before used. In the case of the half-cut double-sided tape, since the tape is cut in a strip shape of a proper length from the beginning, the tape can be stuck without any cutting process when the tape is stuck directly to the place to be stuck or the object to be stuck while being peeled off from the release liner. Therefore, it is convenient for automated applying of the double-sided tape. In the case of the half-cut double-sided tape, since the peeling work of the release liner is performed simultaneously with the sticking work of the double-sided tape to the sticking object place or the sticking object, the winding and collection of the used release liner becomes easy.

From such characteristics, the half-cut double-sided tape is particularly suitable for industrial applications and expected to become more widespread in the future.

FIG. 14 shows a conventional process of a method for manufacturing a half-cut double-sided tape disclosed in JP2016-008262 in the prior art.

As shown in FIG. 14A, a material wound in a roll shape called a sticking tape 1100 is delivered from a first feed reel 1310 to a first take-up reel 1320. The sticking tape 1100 is composed of an adhesive tape 1120, which is a double-sided tape and a manufacturing assist tape 1110, which supports one side of the adhesive tape. The sticking tape 1100 is subjected to half-cut processing by passing between a cutter of a die cut roll 1340 provided with a large number of blades in the middle of delivery and a support base 1330. By this half-cut processing, as shown in FIG. 14 (b), only the adhesive tape of the sticking tape 1100 is cut into a strip shape with an appropriate length and becomes a large number of adhesive tape pieces in a row. That is, prior half-cut processing is performed first on the adhesive tape 1120 that becomes a double-sided tape.

As shown in FIG. 14 (b), in synchronization with the delivery of the sticking tape 1100, a release liner 1200 is delivered from a second feed reel 1410 to the second take-up reel 1420. The half-cut processed sticking tape 1100 passed through the die cut roll 1340 and the peeling release liner 1200 are brought into contact with each other. The adhesive tape piece 1120 is separated from the manufacturing assist tape 1110, and moves and adheres to the release liner 1200 side. That is, as shown in FIG. 14 (c), the half-cut adhesive tape piece 1120 is re-rolled from the manufacturing assist tape 1110 side to the release liner 1200 side.

The release liner 1200 is wound around a second take-up reel 1420, and the half-cut processed double-sided tape is collected in the second take-up reel 1420.

Prior art 1: JP 2016-008262

DISCLOSURE OF THE INVENTION

Problem to be Solved by the Invention

However, there is a problem to be improved in a conventional method for manufacturing a half-cut double-sided tape disclosed in JP 2016-008262 in the prior art.

The first problem is that the cutting edge of the die cut roll directly touches the adhesive at the time of half-cut processing, and a mechanical failure may occur easily in the half-cut processing when the adhesive force of the adhesive is strong.

In a method for manufacturing conventional half-cut double-sided tape of JP 2016-008262, a blade of the die cut roll 1340 is directly applied to the adhesive surface to perform half-cut treatment in a state in which the adhesive is peeled off by transferring from the first feed reel 1310 to the first take-up reel 1320, so that the blade of the die cut roll 1340 directly touches the adhesive as shown in FIG. 14(b). Even if the adhesive property of the adhesive is relatively weak, the adhesive adheres to the blade of the die cut roll 1340 by repeating half-cut process for a long time, and a sharp cut cannot be performed, or a part of the adhesive stuck to the blade of the die cut roll 1340 is moved to the adhesive tape piece 1120 side at the time of half-cutting to cause a problem. In particular, when a pressure-sensitive adhesive tape piece 1120 having large adhesiveness is employed for the industrial application or the like, the possibility problem of occurring is increased.

The second problem is a case in which the transfer of the peeling tape 1200 (the peeling tape for receiving) delivered from the second feeding reel 1410 is not successfully performed. In the method for manufacturing the half-cut double-sided tape disclosed in JP2016-008262, the half-cut adhesive tape piece 1120 has to be rolled from the manu-facturing assist tape 1110 (original release liner before half-cut processing) side to the release liner 1200 (the release tape for receiving after half-cut processing) as shown in FIG. 14 (c). This re-rolling requires the condition for the adhesion of the adhesive, the accuracy of the half-cut processing, and the surface state of both the manufacturing assist tape 1110 (original release liner before half-cut pro-cessing) and the release liner 1200 (the release tape for receiving after half-cut processing). There may be a problem in that a part of the adhesive tape pieces may remain on the manufacturing assist tape 1110 side.

It is an object of the present invention in view of the above problems to provide a manufacturing method and manufac-turing device by which a high-quality half-cut processed double-sided tape can be obtained without directly touching the blade of the die cut roll to the adhesive during half-cut processing, with a simple procedure not using a special material or a processing machine.

Means for Solving the Problems

To achieve the above-mentioned object, the present invention of an automatic insertion device comprises the following configuration. The following configuration can be adopted in any combination as far as possible. Further, the technical features of the present invention are not limited to those described below, and it is to be understood that the technical features are recognized based on the concept of the invention, which can be understood by those skilled in the art from the description of the specification and drawings or the description thereof.

The inventor invented a method for a processing for adding a protection layer is provided in advance to the half-cut processing, and a processing for half-cutting the double-sided tape can be applied onto the protection layer in the half-cut processing, as a technical means for solving the above-mentioned first and second problem. By this novel method, there is no need for the blade of the die cut roll to directly touch the adhesive during half-cut processing and there is no need for the half-cut adhesive tape piece to be moved from the manufacturing assist tape side to the other base. In addition, such manufacturing assist tape can be omitted without wasting it.

A method for manufacturing a half-cut double-sided tape according to the present invention includes a "processing protection layer formation step", a "half-cut step", and a "half-cut double-sided tape winding step" as basic steps, and is further devised in each step.

The "processing protection layer formation step" is a step of delivering a double-sided tape with a release liner where the double-sided tape having an adhesive layer on both surfaces thereof, and the release liner covering the adhesive layer on one surface of the double-sided tape, and a step of feeding a protect release paper tape having the release surface; and forming the processing protection layer on the surface of the double-sided tape with the release liner by bringing the protect release paper tape into contact with the double-sided tape with the release liner.

The "half-cut process step" is a step of a process for continuously performing half-cutting with the processing protection layer and the double-sided tape on the release liner; and making a number of the double-sided tape pieces of proper length are held on the release liner.

The "half-cut double-sided tape winding step" is a step for taking up the double-sided tape with the release liner sub-jected to the half-cut processing while peeling off the processing protection layer.

With the above configuration, a general "double-sided tape with a release liner" available in the market can be employed in the "processing protection layer formation step" as it is. The adhesive layer is faced on the surface when the general "double-sided tape with a release liner" is delivered, but the protect release paper tape as the protection layer is formed on the surface of the adhesive layer. In short, the adhesive layer is covered with the protect release paper tape as the processing protection layer on the surface side and with the release liner on the rear surface. That is, since the surface of the pressure-sensitive adhesive layer for performing half-cut processing is covered with the protect release paper tape as the processing protection layer in advance of the half-cut processing. Therefore, the blade for performing half-cutting is hardly affected by the adhesive layer. In the "half-cut double-sided tape winding process", since the "release liner" is wound while being peeled off, the "double-sided tape with a release liner" in the half-cut processed state is taken up.

That is, according to the present invention, the half-cut double-sided tape can be processed without direct contact of the blade of the die cut roll with the adhesive during half-cut processing, and after half-cut processing, small pieces of the half-cut double-sided tape are formed so as to remain on the original release liner, and the half-cut double-sided tape can be manufactured by a simple method without the need of shifting the half-cut double-sided tape to the other tape base.

The width of the protect release paper tape as the pro-cessing protection layer is larger than that of the double-sided tape with the release liner and larger than that of the blade employed in the half-cut process. The width of the half-cut in the half-cut process is larger than that of the double-sided tape with the release liner and smaller than that of the protect release paper tape for processing.

According to the present manufacturing method, the cut trace of the half-cut in the "half-cut process" can be obtained by using the whole width direction of the double-sided tape with the release liner and the material of the double-sided tape as small pieces of half-cut over all the regions without waste. Since the protect release paper tape as the processing protection layer remains an unprocessed portion that does not cut in the width direction, the protect release paper tape can be easily peeled as one connected body.

If the width of the double-sided tape with the release liner and the width of the protect release paper tape as the processing protection layer are the same, the double-sided tape with the release liner is half-cut in the width direction in order to utilize the material of the double-sided tape with the release liner all in the width direction, so that the protect release paper tape becomes small pieces, and the protect release paper tape cannot be easily peeled off. In the present invention, since the protect release paper tape as the pro-cessing protection layer is wider than the double-sided tape, the end part of the protect release paper tape can be secured as a region (non-cut area in the width direction) left without performing half-cut processing, and the protect release paper tape can be easily peeled with the width direction non-cut area. When the width of the half-cut in the half-cut process-ing step is greater than the width of the double-sided tape, the double-sided tape becomes fully half-cut processed small pieces, so the protect release paper tape is peeled and removed.

The blade used for in the half-cut process is not limited to, for example, a Thomson blade or a die cut roll blade. Further, the interval of the half-cut is not limited, but may be selected according to the application. For example, it may be about several millimeters to several centimeters.

In the above process, it is preferable that the cut trace of the half-cut in the half-cutting process comprises a fully cut portion in the width direction of the double-sided tape with the release liner and a non-cut portion in which at least a portion which is not cut in the width direction of the protect release paper tape as the processing protect layer for remaining in a continuous state without cutting at least a part in the length direction in the protect release paper tape.

For example, the width direction non-cut portion of the protect release paper tape may be formed at both ends in the width direction, or may be formed only on one end in the width direction.

By providing the width-direction non-cutting area in this way, in the "half-cut double-sided tape winding step", peeling is facilitated by peeling off the "protect release paper tape as the protection layer" while applying a non-cutting area in the width direction.

The shape of the blade of the half-cut processing in the "half-cut step" is not limited. For example, the cut trace of the half-cut has a linear shape perpendicular to the width direction, the cut trace of the half-cut has an angle at least a part of in the width direction, and the cut trace of the half-cut may have a variety of curved shapes.

The half-cut double-sided tape sticking device according to the present invention is a half-cut double-sided tape sticking device for sticking a half-cut double-sided tape to a sticking object part. It is provided with a half-cut double-sided tape in a half-cut state in a large number of small pieces and a release liner covering one surface of the half-cut double-sided tape. The half-cut double-sided tape sticking device includes: a roll body attachment part for rotatably supporting the half-cut double-sided tape with the release liner; and a rotary sticking rolling part for delivering the half-cut double-sided tape with the release liner; and a release liner winding part for winding the release liner. The rotary sticking rolling part is provided with a support mechanism for rotatably supporting the rotary body.

Here, a structure of a height control mechanism for controlling the height for supporting the rotary body by the support mechanism can be employed in the above-mentioned configuration.

The height control mechanism controls the height of the rotating body. In sticking the half-cut double-sided tape with the release liner through the rotary sticking rolling part, the sticking control is performed to switch between the "sticking height" sticking on the sticking object place and the "separation height" separating from the sticking object place.

Since the half-cut double-sided tape is originally cut for each small piece, the half-cut double-sided tape is stuck on the object through the rotary sticking rolling part where the rotary body in the "contact height", and the half-cut double-sided tape can be separated from the release liner while leaving the stuck double-sided tape at the sticking place when the half-cut double-sided tape sticking device itself is moved upward. That is, it is not necessary to newly cut with a cutter or the like, and the sticking stroke can be finished.

In the sticking control by the height control mechanism, variation from the "contact height" to the "separation height" can be made.

One is a vertically upward movement. This is the simplest operation. The half-cut double-sided tape sticking device is pulled upward from the sticking place as it is.

In addition, the stuck half-cut double-sided tape is moved obliquely upward in front. The pull-up operation is performed in a so-called forward direction. Since the half-cut double-sided tape is originally cut for each small piece, the half-cut double-sided tape of the small piece stuck to the sticking place is pulled up obliquely forward while leaving the half cut double-sided tape with the release liner. The end part of the half-cut double-sided tape of the small piece at the boundary of the sticking place tries to follow the front oblique upper part. However, the friction between the half-cut double-sided tape and the release paper is extremely small, and it is peeled off from the release paper and stays at the sticking place.

In addition, the stuck half-cut double-sided tape is moved rearward and obliquely upward. The pull-up operation in the opposite direction is a so-called reverse direction. Since the half-cut double-sided tape is originally cut for each small piece, the half-cut double-sided tape of the small piece stuck to the sticking place is pulled up obliquely backward so as to be returned while leaving the half-cut double-sided tape. The end part of the half-cut double-sided tape of the small piece at the boundary of the sticking place tries to follow the rear oblique upper part. However, the friction between the half-cut double-sided tape and the supported release paper is extremely small, and it is peeled off from the release paper and stays at the sticking place.

Further, the cooperation of the feeding operation of the half-cut double-sided tape with the release liner from the roll body attachment part and the sticking operation of the rotary sticking rolling part can be controlled.

First, the roll body attachment part is provided with an automatic rotation control mechanism, and rotation control of the half-cut double-sided tape with the release liner is performed. Although the roll body attachment part is configured to be rotated following the delivery of the half-cut double-sided tape with the release liner, the delivery itself of the half-cut double-sided tape with the release liner is controlled by providing a driving device such as a motor and actively controlling its own rotation.

For each sticking stroke of the half-cut double-sided tape with the release liner, the feeding operation of the half-cut double-sided tape with the release liner from the roll body attachment part and the cooperation of the sticking operation of the rotary sticking rolling part can be controlled.

For example, at the beginning of the sticking stroke, the control of the start of the rotation of the roll body attachment part by the rotation control and the control of the shift movement of the state from the "separation height" to the "contact height" of the rotary body by the height control mechanism of the rotary sticking rolling part are correlated with each other. Further, at the end of the sticking stroke, the control of stop of the rotation of the roll body attachment part by the rotation control and the control of the shift movement of the state from the "contact height" to the "separation height" of the rotary body by the height control mechanism of the rotary sticking rolling part are correlated with each other.

In this way, in the final state of the sticking stroke, the rotation control of the roll body attachment part is controlled actively, the half-cut double-sided tape is not reeled out excessively by the rotational moment of the roll body attachment part, and it is not loosened or deflected, and a good delivery state can be maintained. Since the height control of the rotary body by the height control mechanism of the rotary sticking rolling part is relative, any looseness and deflection of the half-cut double-sided tape due to the fluctuation of the height of the rotary body are not generated, so a good delivery state can be maintained.

As described above, not only the active switching control of the "contact height" and the "separation height" by the height control of the rotating body in the height control mechanism of the rotary sticking rolling part, but also the following adjustment control to follow the unevenness of the object body to be stuck at the "sticking height" is also performed. That is, the "suspension motion mechanism" can follow the unevenness of the object body to be stuck. Since the height control mechanism in the support mechanism of the rotary sticking rolling part employs a "suspension motion mechanism", the object body to be stuck is not limited to be a plane, and the sticking to the three-dimensional object can be performed.

The suspension motion mechanism can be an elasticity of the rotating body (for example, an elastic rubber material, a silicone material, and a sponge material).

The suspension motion mechanism can also be a vertical swing mechanism (for example, a suspension mechanism of a vehicle) that swings vertically.

Further, the suspension motion mechanism can comprises a "steering motion mechanism" for changing an angle in a horizontal plane of the rotating body.

As the "steering motion mechanism", a turning mechanism capable of changing the angle of the rotating body in the horizontal plane is applicable in the supporting mechanism of the rotary sticking rolling part. In addition, a turning mechanism capable of changing an angle in a horizontal plane can be a robot arm supporting and driving the whole half-cut double-sided tape sticking device to change the angle in the horizontal plane of the whole half-cut double-sided tape sticking device.

Here, a single rotating body or a pair of right and left rotating bodies can be used as the rotating body of the rotating sticking rolling part.

The conventional rotary sticking roller only has one capable of simply rotating rotation. However, with the above configuration, the present invention of the half-cut double-sided tape sticking device can comprise a steering motion mechanism that can change an angle in a horizontal plane and a suspension motion mechanism that can follow up and down according to the object surface. The drack drawn by the rotary sticking rolling part can includes a curved line in a horizontal plane and a curve in the vertical direction, so that a so-called three-dimensional track can be possible. When the rotating body is a pair of right and left rotating bodies, track can be drawn like a vehicle track. The small pieces of the half-cut double-sided tape are rolled on the three-dimensional track with respect to the object surface to be stuck according to the three-dimensional track of the rotary sticking rolling part.

As a further contrivance, the rotary sticking rolling part comprises a non-rotating rolling body at the portion contacting to the object surface to be stuck in addition to the rotating body at the rolling part of the half-cut double-sided tape. The width of the rotating body is smaller than the width of the half-cut double-sided tape, and the non-turning rolling body is arranged so as to apply pressure to a rest part of the half-cut double-sided tape that is not under the rotating body. The height of the rotating body and the non-rotating rolling body is preferably substantially the same, that is, the height of the contact surface of the half-cut double-sided tape to the release liner is preferably substantially the same.

The rotating body is rotated while being pressed as a roller, while the non-rotating rolling body works as a so-called spatula or a squeegee edge, and each small piece of the half-cut double-sided tape is rubbed to the sticking surface over the protect release paper tape to support the sticking of the small piece of the half-cut double-sided tape to the object surface to be stuck.

As the arrangement, the rotating body is arranged in the vicinity of the center in the width direction of the half-cut double-sided tape, and the non-turning rolling body can be arranged at both ends in the width direction of the half-cut double-sided tape. In general, in a state where the small piece of half-cut double-sided tape is stuck, a part of the end side may be turned up or floated. However, by arranging a non-turning rolling body at such the end part, the sticking state of the half-cut double-sided tape can be neatly arranged.

As a further contrivance, the half-cut double-sided tape sticking device can comprises a "smoothing roller" that rolls over the stuck half-cut double-sided tape and adjusts the sticking state. By providing the smoothing roller at the rear of the rotary sticking rolling part, the sticking state of the small piece of the stuck half-cut double-sided tape can be smoothed, and the sticking state can be neatly arranged.

Effects of the Invention

According to the present invention of the method for manufacturing the half-cut double-sided tape, by using "processing protection layer formation step", a general double-sided tape with a release liner that is generally available in the market can be used, and the blade of the die cut roll can be used without directly touching the adhesive during half-cut processing, and the blade for performing half-cut is less likely to be affected by the adhesive layer.

In addition, the double-sided tape piece subjected to half-cut processing can be formed on the original release liner, and it is not necessary to move the double-sided tape piece to the other base tape.

Since the protect release paper tape for processing is wider than the double-sided tape with the release liner to be processed, there remains an area (width direction non-cut area) left without half-cutting the end part, and the protect release paper tape for processing can be easily peeled with the width direction non-cut area as a clue.

The present invention of the method for manufacturing the half-cut double-sided tape can provide a high-quality half-cut processed double-sided tape without using a special material or a processing machine by a simple process.

According to the half-cut double-sided tape sticking device of the present invention, the track drawn by the rotary sticking rolling part can be a curve in a horizontal plane and a curve in the vertical direction and becomes a so-called three-dimensional track. The small pieces of the half-cut double-sided tape are sticked according to the three-dimensional track of the rotary sticking rolling part with respect to the object surface to be stuck. The three-dimensional sticking can be carried out.

By arranging a non-rotating rolling body and a smoothing roller, the sticking state of the half-cut double-sided tape can be neatly arranged

DETAILED DESCRIPTION OF THE PREFERRED EMBODIMENT

Some Embodiments of an automatic insertion device according to the present invention are described below with reference to the relevant drawing. Needless to add, the claims of the present invention include but are not limited to the application, configuration, or quantity shown in the following Embodiments.

As Embodiment 1, a method of manufacturing a half-cut double-sided tape includes three steps of a "processing protection layer formation step", a "half-cut step", and a "half-cut double-sided tape winding step" is described below.

Embodiment 1

A manufacturing method of half-cut double-sided tape according to Embodiment 1 of the present invention is described.

In the following description, the feeding direction and the winding direction of the double-sided tape with the release liner and the peeling processing protection tape are defined as "length direction", and the direction orthogonal to the length direction is defined as the "width direction". In the half-cut strip-shaped small piece, the direction along the length direction of the original tape is described as a length direction and a width direction corresponding to the width direction of the original tape is described as a width direction.

Figure 1:
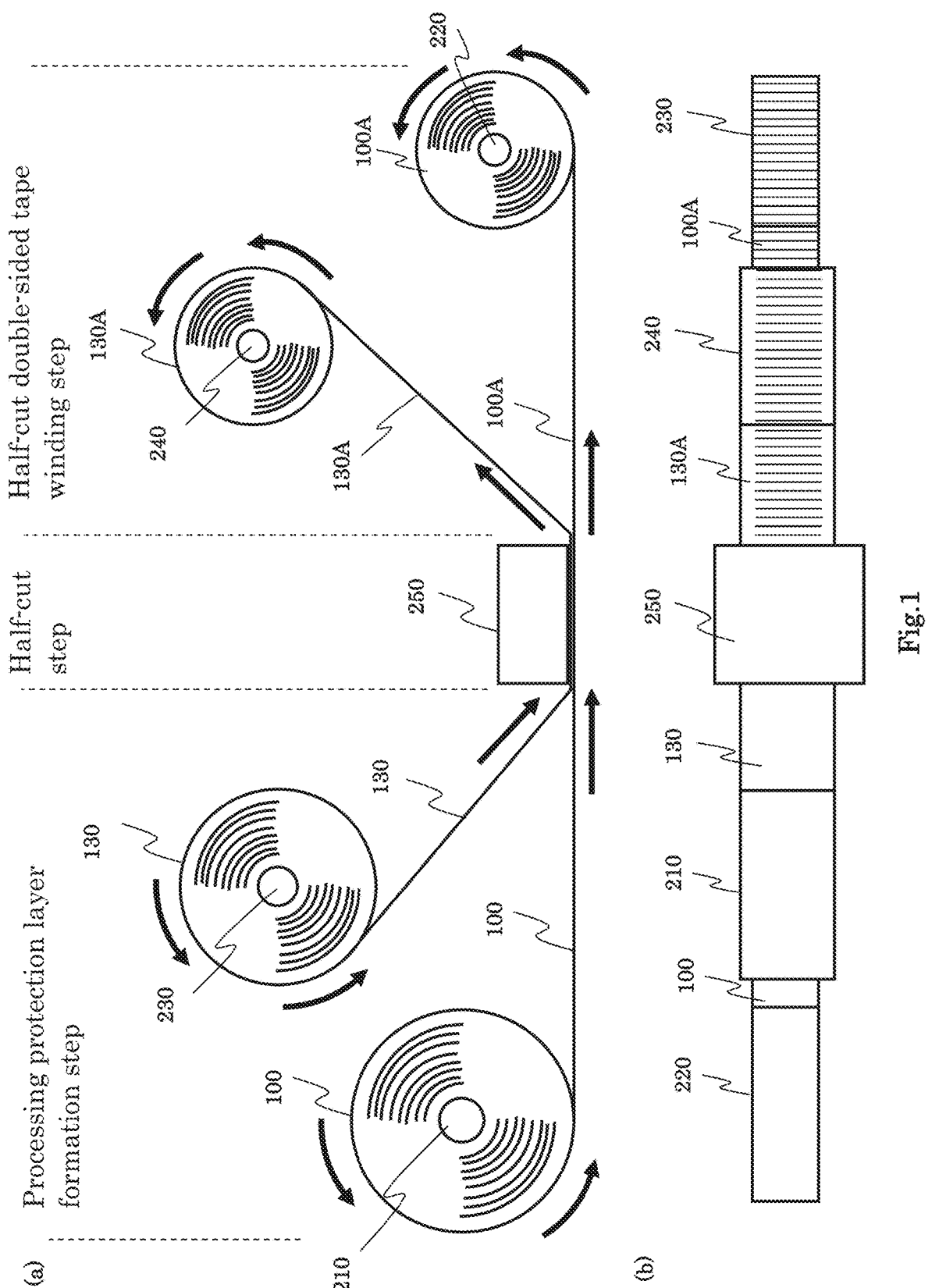
FIG. 1 (*a*)-(*b*) are schematic views showing a process from a "processing protection layer forming step" to a "half cut double-sided tape winding step" in a process of a half-cut double-sided tape manufacturing method 100 of the present invention.

FIG. 1 is a schematic view showing a process from a "processing protection layer forming step" to a "half-cut double-sided tape winding step" in a process of a half-cut double-sided tape manufacturing method 100 of the present invention. FIG. 1 (a) shows a side view of the flow of the manufacturing process as viewed from the side surface, and FIG. 1 (b) shows a plan view of the flow of the manufacturing process viewed from the upper surface.

Figure 2:
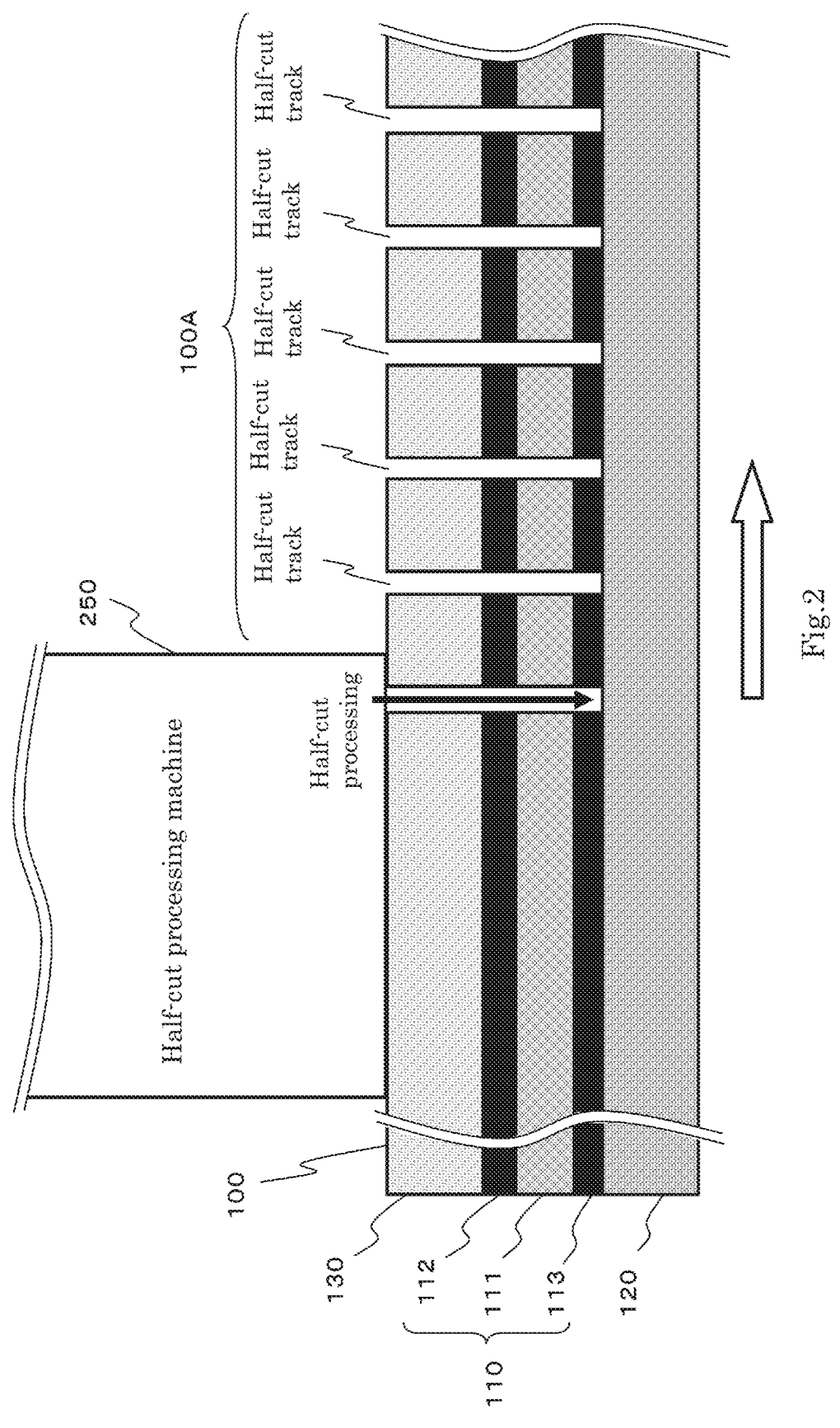
FIG. 2 is a schematic view showing a non-cut portion, which is not cut, remaining as a continuous state in the "half-cut step".

FIG. 2 is a schematic view showing a non-cut portion which is not cut remaining as continuous state in the "half-cut step" according to Embodiment 1.

First, a "processing protection layer forming step" will be described.

As the material to be used in the present invention, the double-sided tape with the release liner 100 is a main material. The double-sided tape with the release liner 100 may not be a special one, may be a general double-sided tape material with a release liner in the market. As shown in FIG. 2 to be described later, the double-sided tape with the release liner 100 has a double-sided tape 110 provided with a base material layer 111 and adhesive layers 112 and 113 provided on both sides of the base material layer 111, and a release liner 120. They are formed into a tape shape. The double-sided tape with the release liner 100 having such a structure is a general-purpose double-sided tape 100, which can be obtained in the market, and may also be a special double-sided tape comprising the special base material layer 111, the special adhesive layers 112, 113. However, the structure of the double-sided tape with the release liner 100 may be a general structure. In this example, a double-sided tape with a release liner 100 having a roll shape is attached to the feed reel 210 and delivered from the feed reel 210 to the winding reel 220.

In the "processing protection layer formation step", the double-sided tape with the release liner 100 is covered with a protect release paper tape 130 at least which contact surface is a stripping surface.

The protect release paper tape 130 for processing does not comprise an adhesive layer or the like. The protect release paper tape 130 is used for covering the surface of the double-sided tape with the release liner 100 where the release liner 120 is not provided (in FIG. 2, the protect release paper tape 130 covers onto the upper adhesive layer 112). The pressure-sensitive adhesive layer 112 is temporarily covered and protected by the protect release paper tape 130, so the release agent is preferably applied to at least the covering surface the protect release paper tape 130 so as to be easily peeled off because the pressure-sensitive adhesive layer 112 is peeled off again in the "half-cut double-sided tape winding process". In this example, a roll-shaped protect release paper tape 130 is attached to a feed reel 230 and delivered from the feed reel 230 to the winding reel 240.

The processing conditions of the width of the double-sided tape with the release liner 100, the width of the protect release paper tape 130 and the width of the half-cut by the half-cut processing machine 250 are described.

In this example, as shown in FIG. 1 (b), the width of the protect release paper tape 130 is larger than that of the double-sided tape with the release liner 100. That is, when the double-sided tape with the release liner 100 is covered with the protect release paper tape 130 for processing, the protect release paper tape 130 can cover all upper surface of the double-sided tape with the release liner 100, and both ends of the protect release paper tape 130 extend outward from both ends of the double-sided tape with the release liner 100 in the width direction.

When the width of the half-cut blade in the half-cut processing machine 250 in the half-cutting process is equal to or larger than that of the double-sided tape with the release liner 100 and smaller than that of the protect release paper tape 130 as shown in FIG. 1 (b), a non-cut region left without being cut at both ends in the width direction is formed in the protect release paper tape 130 after the half-cut processing by the half-cut processing machine 250. The double-sided tape with the release liner 100 covered by the protect release paper tape 130 is cut to the full width in the width direction, and there is no non-cut region left. That is, the double-sided tape 100 is half-cut into small pieces in each strip shape.

Under the above conditions, the flow of the "process protection layer formation process" is briefly described below.

First, as shown in FIG. 1, in the "processing protection layer formation step", the double-sided tape with a release liner 100 and the protect release paper tape 130 for processing are fed out synchronously from a feed reel 210 and a feed reel 230.

As shown in FIG. 1, the double-sided tape with the release liner 100 is covered by the protect release paper tape 130 by bringing the protect release paper tape 130 into contact with the surface on the side where the release liner 120 is not provided in the double-sided tape with the release liner 100 (as shown in FIG. 1 and FIG. 2), thereby forming the processing protection layer onto the surface of the double-sided tape with the release liner 100.

In general, when the double-sided tape with the release liner 100 available in the market is just delivered as it is from the feed reel 210, the surface of the adhesive layer 112 is exposed. However, according to the present invention, the protect release paper tape 130 is brought into contact with the surface of the double-sided tape 110 via the "processing protection layer formation step", and the release liner 120 serving as a support layer is provided on other surface (here, the lower surface) of the double-sided tape 110 as shown in FIG. 2. The protect release paper tape 130 becoming the processing protection layer is formed onto the surface (here, the upper surface) of the double-sided tape 110. It is sent to the "half-cut process"

Since the surface of the adhesive layer 112 to be processed for half-cut processing in the "half-cut process" is covered with the protect release paper tape 130 as the processing protecting layer, the blade for performing half-cut is hardly affected by the adhesive layer.

The "half-cut process" is a process for applying half-cut processing to the double-sided tape with the release liner 100 covered with the protect release paper tape 130 as the processing protection layer. As shown in FIG. 1 and FIG. 2, the half-cut processing is performed at a predetermined interval by a half-cut processing machine 250.

The half-cut processing machine 250 for performing half-cut is not a special one, and may be a half-cut processing machine available in the market. The half-cut processing machine may be a Thomson type half-cut processing machine using a Thomson blade, a die cut half-cut processing machine using a die cut roll blade, or the like. Here, for example, a Thomson type half-cut processing machine using a Thomson blade is used.

FIG. 2 is a schematic view showing a non-cut portion in a longitudinal section which is not cut remaining as continuous state in the "half-cut step".

As shown in FIG. 2, the half-cut processing is executed from the protect release paper tape 130, the adhesive layer 112 of the double-sided tape 110, the base material 111 up to the adhesive layer 112. The lower release liner 120 is left without being cut. The interval in the length direction of the half-cut is not limited but may be selected according to the application. For example, it may be about 1 millimeter, several millimeters, or several centimeters.

By continuously performing the half-cut processing, as a result of the "half-cut process", a protect release paper tape 130, a pressure-sensitive adhesive layer 112 of the double-sided tape 110, a base material 111, and an adhesive layer 112 are cut together, so that a large number of strip-like small pieces in proper length of the double-sided tape piece is made. That is, when the "protect release paper tape 130" and the double-sided tape with the release liner 100 overlapped in a layered state is passed through the half-cut processing machine 250, the "half-cut processed protect release paper tape 130A" and the "double-sided tape with a half-cut processed release liner 100A" are generated as layers.

Here, as shown in FIG. 1 (b), the half-cut width of the half-cut processing machine 250 is substantially the same as that of the double-sided tape with the release liner 100. However, the half-cut width of the half-cut processing machine 250 becomes smaller than that of the protect release paper tape 130, and the "width-direction non-cut area" is formed at both ends in the width direction of the protect release paper tape 130.

Here, the cut trace of the half-cut processing will be described.

Figure 3:
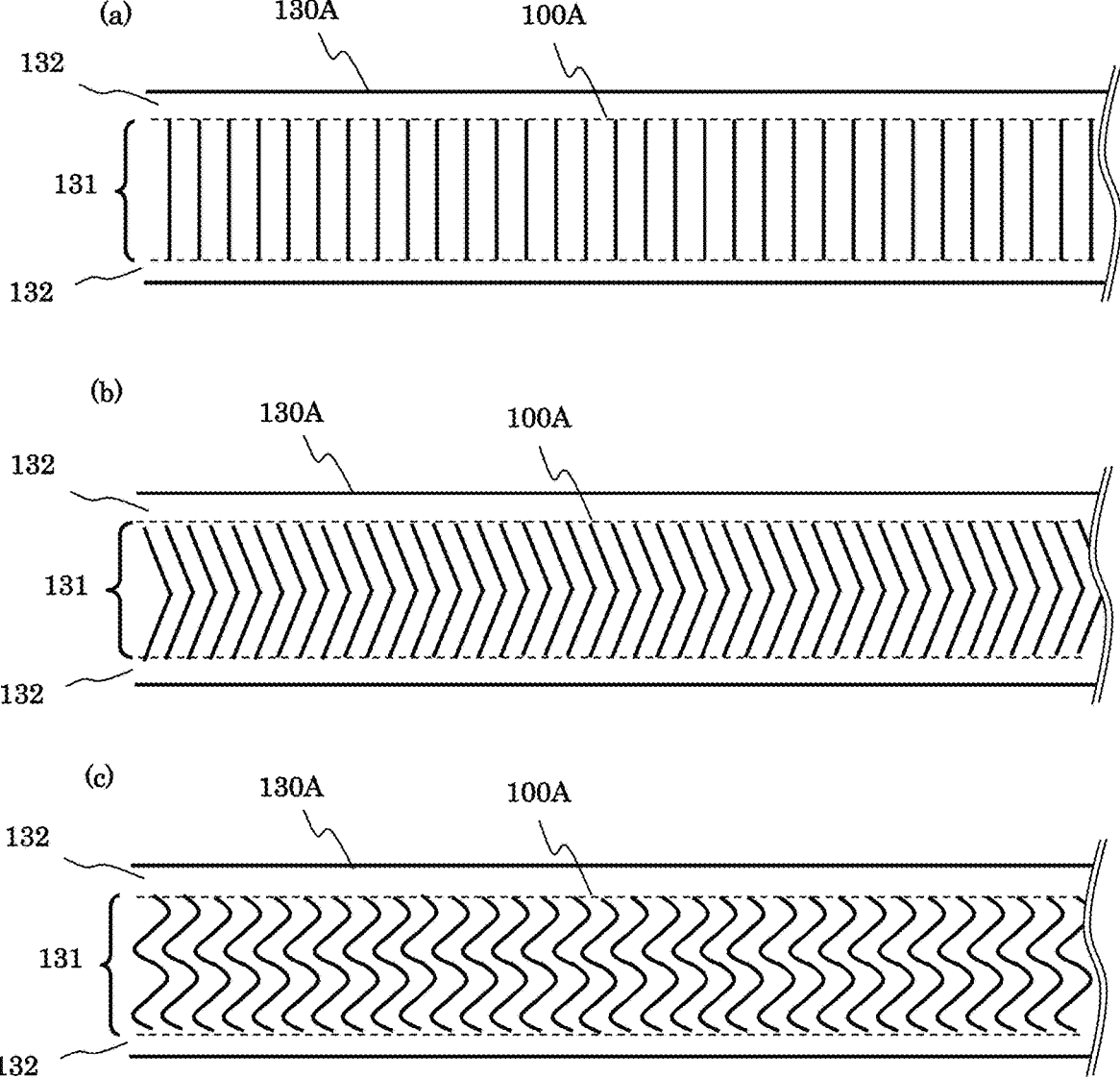
FIG. 3 (a)-(c) are schematic views showing the cut result after the "half-cut step".

FIG. 3 is a schematic view showing an example of the cut track after half-cut processing. Since only the wide-width protect release paper tape 130 covering the upper surface is shown by a solid line as seen from the top, and the double-sided tape with the release liner 100 is shown by a dotted line so that the state of the double-sided tape with the release liner 100.

As shown in FIG. 3, the cut trace itself of the half-cut processing may have various shapes. In this example, both the width-direction cutting region 131 for cutting the full width of the double-sided tape in the width direction, and the width-direction non-cut region 132 in which a part of the protect release paper tape 130 is not cut, are formed. The width direction non-cut area 132 of the protect release paper tape 130 is maintained in a continuous state without being cut in the length direction.

The example of FIG. 3 (a) is an example in which the cut trace of the half-cut is a straight line perpendicular to the width direction. A width direction cutting area 131 is formed by half-cutting the protect release paper tape 130 and the liner double-sided tape 100 on the center side, and a width direction non-cut area 132 is formed at both ends in the width direction. When the cut track becomes as shown in FIG. 3 (a), each double-sided tape piece to be stuck is formed in a strip shape as shown in FIG. 7 (a) to be described later.

Figure 7:
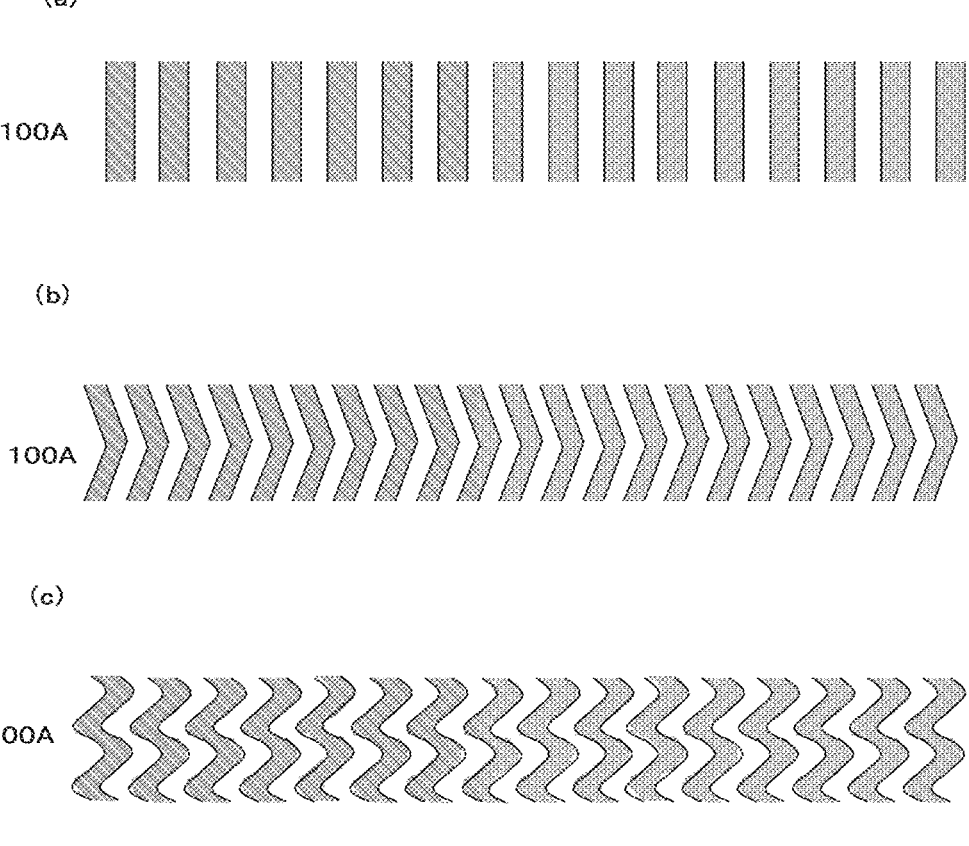
FIG. 7 (a)-(c) are schematic views simply showing a sticking track of the half-cut double-sided tape 100A stuck to the place to be stuck.

In FIG. 7 (a) to FIG. 7 (c), the interval between the pieces of the double-sided tape pieces of the half-cut double-sided tape 100A is intentionally enlarged so that the shape of one double-sided tape piece of the half cut double-sided tape 100A is easy to understand. However, since the cutting edge of the half-cut processing machine is actually sharp, the interval between the strip-shaped double-sided tape small pieces on the release liner 120 is small. In FIG. 7, the shapes of the respective strip-like double-sided tape small pieces and the sticking track are easily shown with a large interval so as to be easy to understand.

In the example of FIG. 3 (*b*), the cut trace of the width direction cutting region 131 has an angle in the width direction. In the example of FIG. 3 (*b*), the width direction cut region 131 is provided in which a protect release paper tape 130 and the double-sided tape with release liner 100 are half-cut together on the center side. The width direction non-cut region 132 is formed at both ends in the width direction. When the cut track becomes as shown FIG. 3 (*b*), each double-sided tape piece to be stuck becomes a V-shape as shown in FIG. 7 (*b*) to be described later.

In the example of FIG. 3 (*c*), the cut trace of the width direction cutting region 131 is a curve. In the example of FIG. 3 (*c*), the width-direction cutting region 131 is provided in which the protect release paper tape 130 and the double-sided tape 100 on the center side, and a width-direction non-cut region 132 is formed at both ends in the width direction. If the cut track of FIG. 3 (*c*) is a cut trace of FIG. 3 (*c*), each of the stuck double-sided tape pieces becomes a curved line as shown in FIG. 7 (*c*) to be described later.

In this way, the shape of each of the double-sided tape pieces is not particularly limited.

By providing the width-direction non-cut region 132, the "half-cut processed protect release paper tape 130A" can be easily peeled off from the "half-cut double-sided tape with a release liner 100A" in the "half-cut double-sided tape winding process" because the width-direction non-cut region 132 can work, so that separation is facilitated.

Next, the "half-cut double-sided tape winding process" is started.

The "half-cut double-sided tape winding step" is a step for winding up the double-sided tape 100A and winding up the half-cut processed release liner 130A separately by peeling off. The half-cut processed protect release paper tape 130A that was subjected to half-cut processing is no longer required.

As shown in FIG. 1, as the "half-cut double-sided tape winding step", the half-cut processed protect release paper tape 130A is peeled from the half-cut processed double-sided tape 100A and separated into a double-sided tape with release liner 100A and the half-cut processed protect release paper tape 130A.

Figure 4:
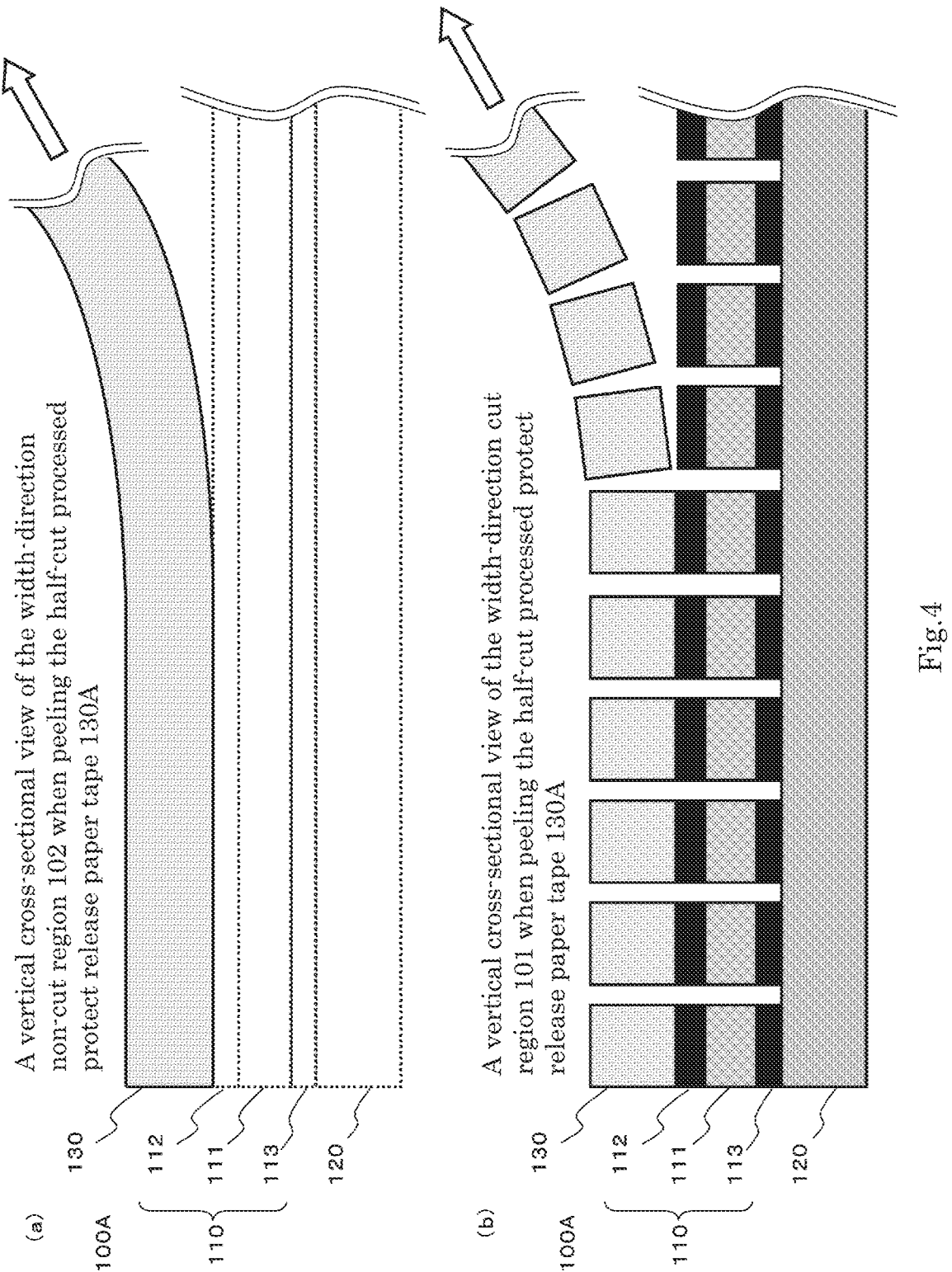
FIG. 4 (a)-(b) are schematic views showing the release of the processing protection layer in the "half-cut double-sided tape winding step".

FIG. 4 is a schematic view showing the release of the protect release paper tape 130A as the processing protection layer in the half-cut double-sided tape winding process.

FIG. 4 (*a*) shows a vertical cross-sectional view at a place where the width-direction non-cut region 132 is provided. The cut end surface of the half-cut protect release paper tape 130A on the upper side is shown, but the respective layers of the double-sided tape with the half-cut processed release liner 100A are not present below. In short, although each layer corresponding to the double-sided tape with a half-cut processed release liner 100A is shown by dotted line in FIG. 4 (*a*), it does not actually exist under the width-direction non-cut region 132.

As shown in FIG. 4 (*a*), the half-cut processed protect release paper tape 130A is continuous in the length direction as the width-direction non-cut region 132. As a result, the peeling of the half-cut processed protect release paper tape 130A is facilitated one after another in the length direction because it is continuous, not cut-off.

FIG. 4 (*b*) shows a vertical cross-sectional view at a place where the width-direction cutting region 131 is provided in which the protect release paper tape 130A is cut together with the release liner-equipped double-sided tape 100A. Since the protect release paper tape 130A has the continuous region in the length direction, the protect release paper tape 130A can be peeled one after another in the length direction and is easily separated into the half-cut processed double-sided tape 100A and the half-cut processed protect release paper tape 130A. The half-cut processed double-sided tape 100A is left on the release liner 120.

In the conventional method for manufacturing the half-cut double-sided tape by the prior JP 2016-008682, each piece of the half-cut processed double-sided tape should be transferred from the base tape to the other base tape. However, the method for manufacturing the half-cut double-sided tape according to the present invention only requires peeling the protect release paper tape 130A that has been temporarily covered onto the double-sided tape off the half-cut processed double-sided tape. Such difficult work required by the prior JP 2016-008682 is not needed.

After the peeling off the protect release paper tape 130A, as shown in FIG. 1, the half-cut double-sided tape with the release liner 100A in the half-cut processed state is wound up by the winding reel 220. On the other hand, the protect release paper tape 130A for protecting in the half-cut processing is winding up by the winding reel 240. The protect release paper tape 130A is not required anymore after finishing its role, and it may be discarded.

Next, the sticking process of the half-cut double-sided tape 100A obtained by the method of manufacturing the half-cut double-sided tape of the present invention will be described.

Figure 5:
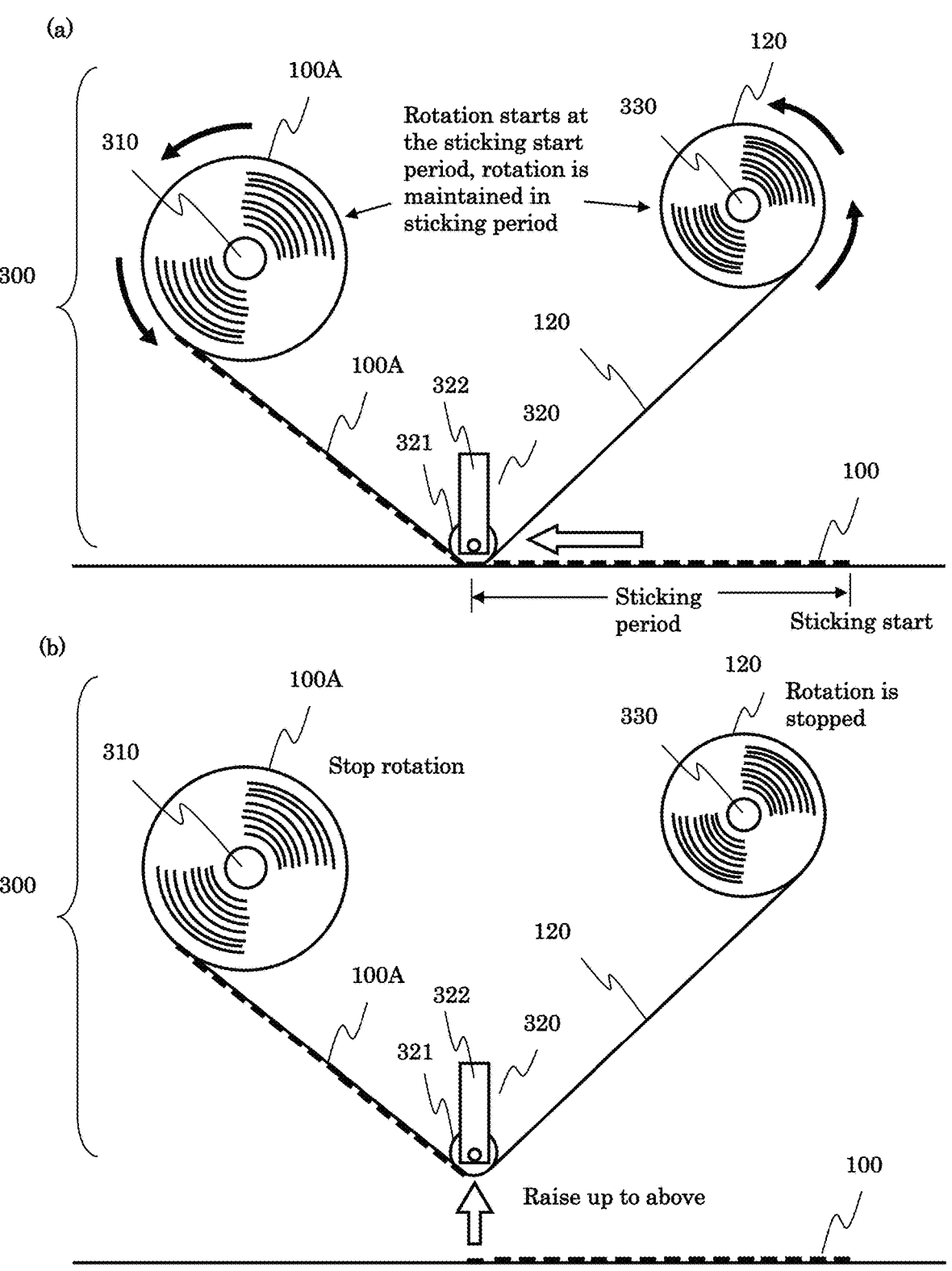
FIG. 5 (a)-(b) are schematic views simply showing a state in which a half-cut double-sided tape 100A is stuck to a sticking target place by using a half-cut double-sided tape sticking device 300.

FIG. 5 is a schematic view simply showing the half-cut double-sided tape sticking device 300 for stacking the half-cut double-sided tape 100A of the present invention.

FIG. 5 (*a*) is a schematic view simply showing a state in which the half-cut double-sided tape 100A obtained by the method of manufacturing the half-cut double-sided tape according to the present invention is applied to the portion to be stuck. FIG. 5 (*b*) is a schematic view simply showing a state after the half-cut double-sided tape 100 is stuck to a place to be stuck and then the half-cut double-sided tape sticking device 300 is separated.

As shown in FIG. 5 (*a*), the half-cut double-sided tape sticking device 300 comprises the roll body attachment part 310 for rotatably supporting the half-cut double-sided tape 100A, the rotary sticking rolling part 320 for passing the fed half-cut double-sided tape 100A with the release liner, and the release liner winding part 330 for winding the release liner 120.

The rotary sticking rolling part 320 is provided with the rotary body 321 and the support mechanism 322 for rotatably supporting the rotary body 321. Another device configuration is also possible.

The support mechanism 322 is shown simply, and only a part of the mechanism around the rotary sticking rolling part 320 is shown.

As shown in FIG. 5, the half-cut double-sided tape 100A with a release liner is rolled into a roll shape and is mounted so as to be delivered to the roll body attachment part 310 of a sticking device 300. When the double-sided tape is stuck and used, the half-cut double-sided tape 100A is delivered downward while the pressure-sensitive adhesive layer 112 is exposed. The half-cut double-sided tape 100A goes downward to the sticking object place together with the release liner 120 while the rotary sticking rolling part 320 is rotated. If the physical property of the surface of the place to be stuck is suitable for adhering the adhesive layer 112, the half-cut double-sided tape 100A is left and simultaneously the release liner 120 is peeled off. The release liner 120 is wound by the release liner recovery part 320.

Here, the support mechanism 322 is devised to have the height control mechanism (not shown) for controlling the height for supporting the rotary body 321.

The height control mechanism is a mechanism for controlling the height of the rotating body 321. The rotary sticking rolling part 320 is a mechanism for performing sticking control for switching between a "contact height", which is a height where the half-cut double-sided tape with a release liner comes into contact with the sticking object place, and a "separation height", which is a height where the half-cut double-sided tape with the release liner is separated from the sticking object place.

The half-cut double-sided tape sticking device 300 repeats the stroke of sticking the half-cut double-sided tape when the object to be stuck traveling relatively continuously is immediately below. For example, one sticking stroke comprises the following steps, a step of "sticking start" for setting the height of the rotating body 321 to the sticking height when the traveling object to be stuck is immediately below, a step of "sticking period" for sticking the half-cut double-sided tape 100 by relatively moving the sticking object over the predetermined length, a step of "sticking completion" for pulling up and separating the rotating body 321 upward so that the height of the rotating body 321 becomes separation height, and a step of "sticking preparation" for waiting for the arrival of the next sticking object. These steps are repeated as one stroke.

Several modification can be applied in the above-mentioned sticking stroke.

First, the delivering operation of the half-cut double-sided tape with the release liner from the roll body attachment part and the sticking operation of the rotary sticking rolling part can be correlated.

When the roll body attachment part 310 and the release liner winding part 320 are provided with an automatic rotation control mechanism, the delivery control of the half-cut double-sided tape with the release liner can be performed. Although the roll body attachment part 310 is configured to be rotated just following the delivery of the half-cut double-sided tape, the delivery of the half-cut double-sided tape is controlled actively by providing a driving device such as a motor and actively controlling its own rotation.

As shown in FIG. 5 (*a*), when the start of the rotation is synchronized by the rotation control of the roll body attachment part 310 and the release liner winding part 320 in each sticking stroke of the half-cut double-sided tape, and the turning from the "separation height" to the "contact height" by the sticking control of the height control mechanism is correlated, excess half-cut double-sided tape is not delivered and loosened or deflected in the sticking period of the sticking stroke, and the good delivery state can be maintained.

As shown in FIG. 5 (*b*), the movement of the rotation is synchronized by the rotation control of the roll body attachment part 310 and the release liner winding part 320 in the final end (sticking end) of the sticking stroke, and the movement of the shift from the "contact height" and the "separation height" of the rotary body 321 is correlated by the height control mechanism, the half-cut double-sided tape is not reeled out excessively by the rotation moment of the roll body attachment part 310, and the good delivery state can be maintained. Since the height control of the rotary body by the height control mechanism of the rotary sticking rolling part is provided, looseness and deflection of the half-cut double-sided tape with the release liner due to the fluctuation of the height of the rotary body are not generated, and a good delivery state can be maintained.

Next, the height control of the rotating body 321 by the height control mechanism is described.

FIG. 5 (*b*) shows a state in which the height of the rotating body 321 is pulled up to a "separation height" by the height control mechanism at the "end of stacking".

In the sticking stroke, while the height of the rotating body 321 is maintained at the "sticking height" by the height control mechanism during the "sticking start" to "sticking period", the height of the rotating body 321 is pulled up to the "separation height" by the height control mechanism at the end of the "sticking period". As shown in FIG. 5 (*b*), when the height of the rotary body 321 is pulled up to the "separation height" by the height control mechanism, the half-cut double-sided tape 100A on the release paper 120 is left as it is. However, the half-cut double-sided tape 100A already stuck to the place to be stuck is left to the place to be stuck, and both are separated.

In this way, the half-cut double-sided tape 100A itself is an independent half-cut double-sided tape piece, and after sticking, the half-cut double-sided tape 100A itself is in an independent state on the surface of the sticking object place. When the half-cut double-sided tape 100A is stuck at the place to be stuck in the desired length, the half-cut double-sided tape pieces are left on the surface of the sticking object place as they are when the sticking device 300 is pulled up.

As described above, the height control mechanism performs the sticking control for switching the height of the rotating body 321 to the "sticking height" sticking on the object place and the "separation height" separating from the sticking object place. Here, in the switching of the "contact height" and the "separation height", the height control mechanism pulls up the rotary body 321 upward, but some of the lifting patterns can be possible.

The pattern shown in FIG. 5 (*b*) is a first pattern of sticking control by the height control mechanism, and a change from the "contact height" to the "separation height" is in a vertically upward pattern. This has already been described above.

Figure 6:
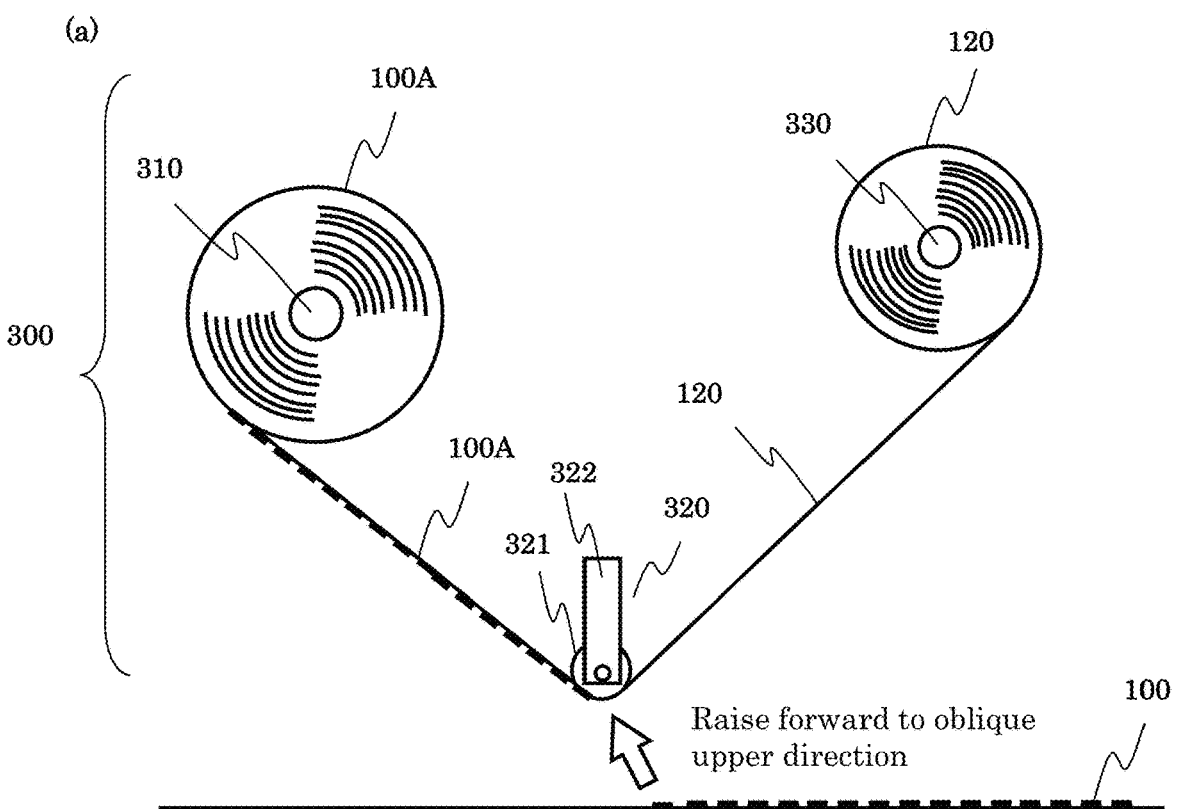
FIG. 6 (a)-(b) are schematic views simply showing a state in which a half-cut double-sided tape 100A is separated forward and obliquely upward or separated rear and obliquely upward by using the half-cut double-sided tape sticking device 300 to the place to be stuck.
Figure 6:
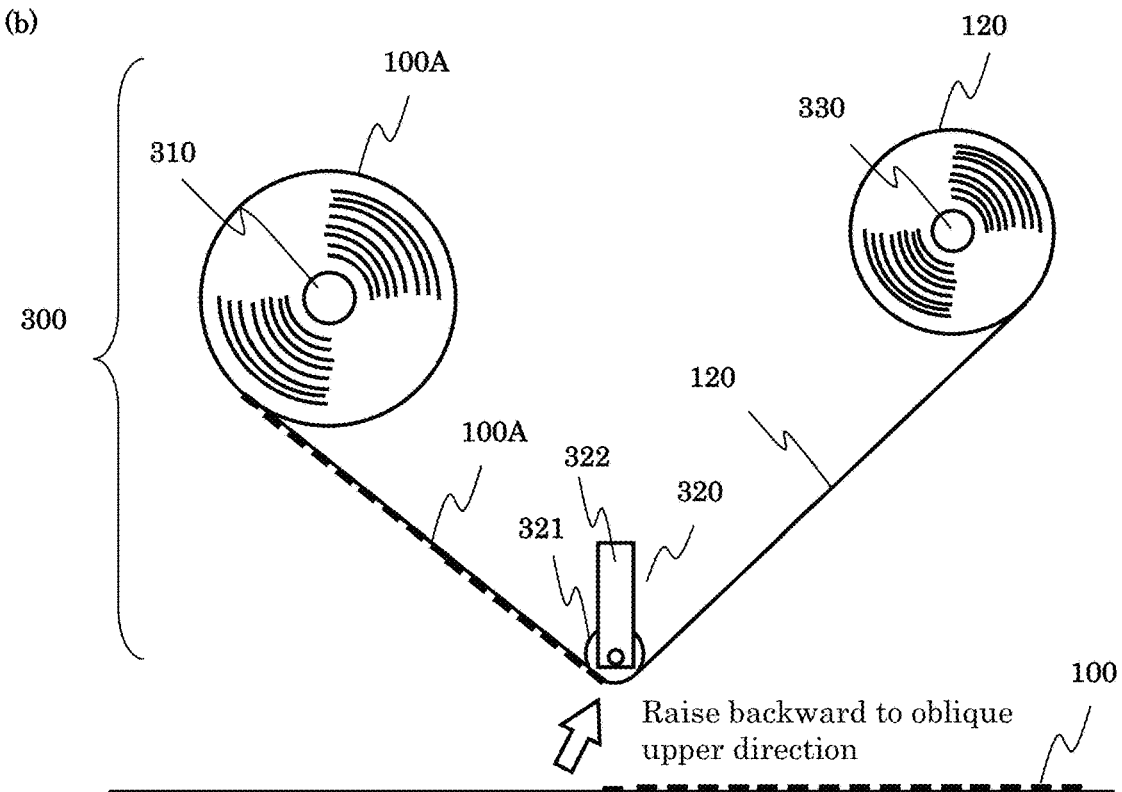

Next, FIG. 6 (*a*) is a second pattern of the sticking control by the height control mechanism, and the change from the "contact height" to the "separation height" is in the forward oblique upper direction of the stuck half-cut double-sided tape. The pull-up operation is performed in a so-called forward direction.

Since the half-cut double-sided tape is originally cut into each small piece, it is considered that the end part of the half-cut double-sided tape existing at the boundary of the sticking place follows the forward direction while leaving the half-cut double-sided tape stuck to the sticking place. However, actually, the friction between each piece of the half-cut double-sided tape and the protect release paper tape is extremely small, so the stuck half-cut double-sided tape is peeled off from the release paper and remains at the sticking place as shown in FIG. 6 (*a*).

Next, FIG. 6 (*b*) is a third pattern of the sticking control by the height control mechanism, and the change from the "contact height" to the "separation height" is in the rear oblique upper direction of the stuck half-cut double-sided tape. The pull-up operation in the opposite direction is a so-called reverse direction.

As described above, since the half-cut double-sided tape is originally cut into each small piece, it is considered that the end part of the half-cut double-sided tape existing at the boundary of the sticking place follows the backward direction while leaving the half-cut double-sided tape stuck to the sticking place. However, actually, the friction between each piece of the half-cut double-sided tape and the protect release paper tape is extremely small, so the stuck half-cut double-sided tape is peeled off from the release paper and remains at the sticking place as shown in FIG. 6 (b).

Next, the half-cut double-sided tape 100 after sticking will be described.

FIG. 7 is a schematic view simply showing a sticking track of the half-cut double-sided tape 100A stuck to the place to be stuck.

FIG. 7 (a) shows the stuck state of the half-cut double-sided tape 100A, which strip shape is shown in FIG. 3 (a). Each of the double-sided tape small pieces has a strip-like shape, and each of the double-sided tape pieces is independent of each other. In practice, since the cutting edge of the half-cut processing machine is sharp, the interval between the strip-shaped double-sided tape small pieces on the release liner 120 is small, but here, the shape and the interval of each strip-shaped double-sided tape shown larger to understand the sticking track easily.

FIG. 7 (b) shows the sticking state of the half-cut double-sided tape 100A, which strip shape is shown in FIG. 3 (b). Each of the double-sided tape pieces has an angle, and each of the double-sided tape pieces is independent of each other.

FIG. 7 (c) shows the sticking state of the half-cut double-sided tape 100A, which strip shape is shown in FIG. 3 (c). Each of the double-sided tape pieces has a curved line, and each of the double-sided tape pieces is independent of each other.

Next, an improved sticking device 400 for sticking the half-cut double-sided tape 100A according to the present invention will be described. The improved sticking device 400 comprises the roll body attachment part 410, the rotary sticking rolling part 420, and the release liner winding part 430 in the same manner as the sticking device 300, but there is an improvement in the structure in the rotary sticking rolling part 420.

Figure 8:
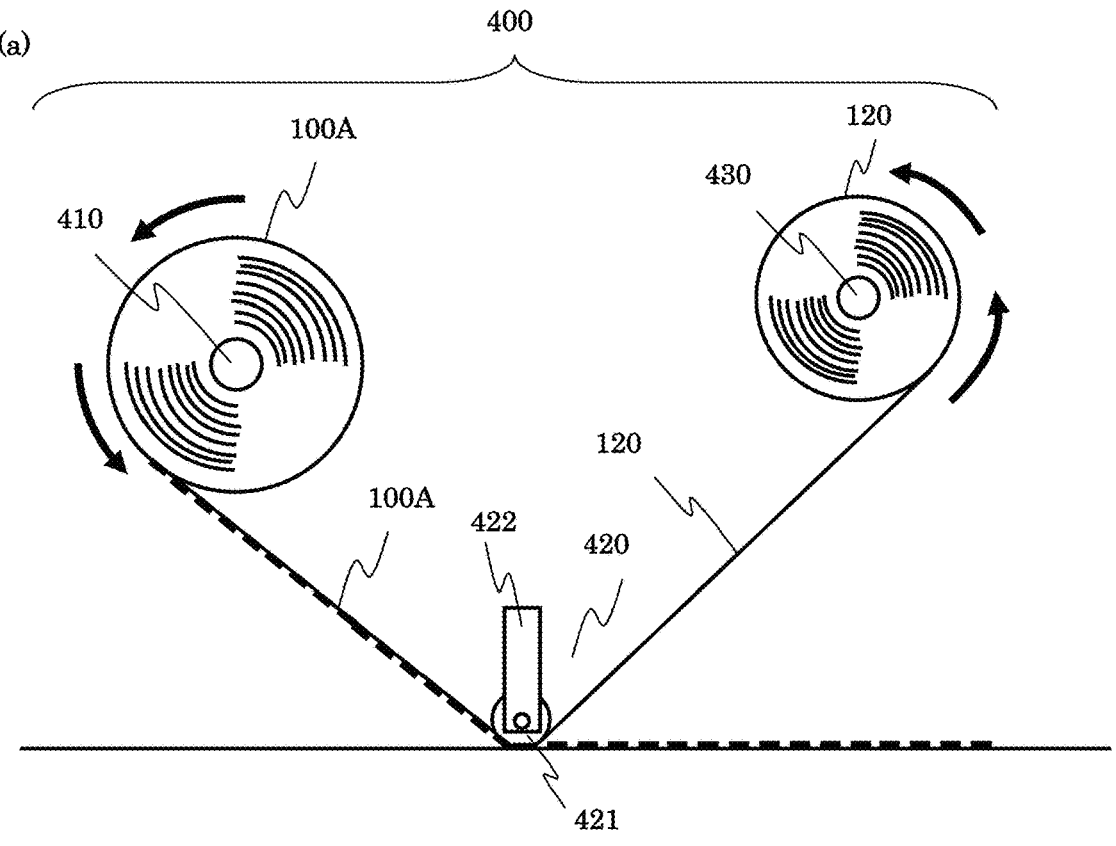
FIG. 8 (a)-(c) are schematic views showing a steering mechanism and a suspension mechanism of an improved half-cut double-sided tape sticking device 400 of the half-cut double-sided tape 100A.
Figure 8:
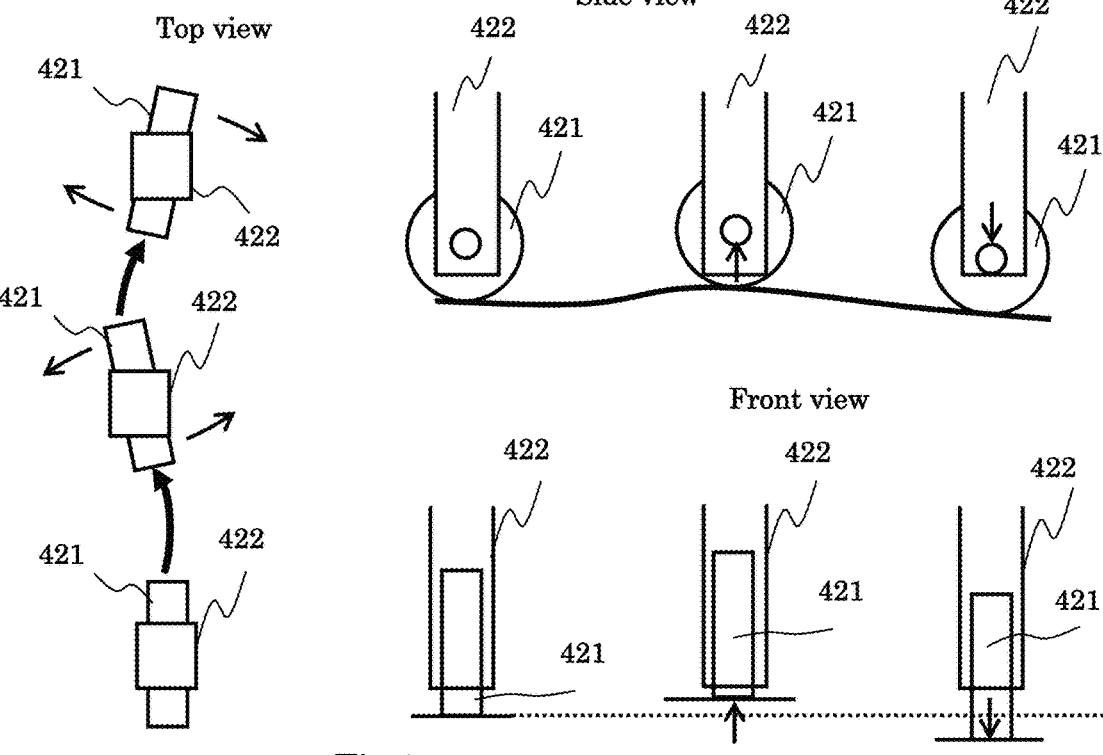

FIG. 8 is a vertical cross-sectional view and a horizontal cross-sectional view of a part of the improved sticking device 400 for sticking the half-cut double-sided tape 100A in a very simple manner. Only a part required for explanation is described without other structure.

In the example shown in FIG. 8 (a), the improved sticking device 400 comprises the roll body attachment part 410 for rotatably supporting the half-cut double-sided tape 100A with the roll-shaped release liner; the rotary sticking rolling part 420 for passing the delivered half-cut double-sided tape 100A with the release liner; and the release liner winding part 430 for winding the release liner 120. Another device configuration is also possible.

As shown in FIG. 8, the rotational sticking rolling part 420 includes the rotating body 421, and the supporting mechanism 422 for supporting the rotating shaft of the rotating body 421. The rotating body 421 is also provided with a suspension motion mechanism capable of moving up and down with respect to the surface of the object to be stuck, and a steering motion mechanism for changing the angle in the horizontal plane of the rotating body 421.

The "suspension motion mechanism" of the rotating body 421 referred to here is not a change to the "contact height" and the "separation height" of the rotor in the height control mechanism of the support mechanism already described above. The suspension is referred to as a suspension following the unevenness of the surface body to be stuck in maintaining of the "contact height" of the rotor in the height control mechanism in the "sticking start" to "sticking period" in the sticking stroke.

There are various suspension motion mechanisms capable of moving up and down the rotor 421 with respect to the surface of the object to be stuck. For example, elastic bodies such as a rubber material, a silicone material, and a sponge material can be used. The suspension motion mechanism is provided by the elasticity. The rotary body 421 can be a multilayer structure, and at least the surface layer is composed of an elastic body such as a rubber material, a silicone material, and a sponge material (not shown). As shown in FIG. 8 (c), a configuration in which an elastic body such as a spring for swinging the rotary shaft in the vertical direction is incorporated in the support mechanism 422 for supporting the rotary body 421, a configuration in which an air spring is employed, and the like can be adopted.

Next, a steering motion mechanism will be described.

The "steering motion mechanism" is a steering motion mechanism in which the rotating body changes an angle in the horizontal plane. The "steering motion mechanism" may be incorporated in the support mechanism 422. The "steering motion mechanism" may be incorporated in a robot arm supporting the entire half-cut double-sided tape sticking device 400 to change the angle in the horizontal plane by moving whole half-cut double-sided tape sticking device 400.

In FIG. 8 (b), a support mechanism 422 for supporting the rotary shaft can be controlled so as to change an angle in a horizontal plane. As shown in FIG. 8 (b), the mechanism actively changing an angle by being supported from outside the mechanism may be used, or the angle may be changed following to the advancing direction of the improved sticking device 400.

Figure 9:
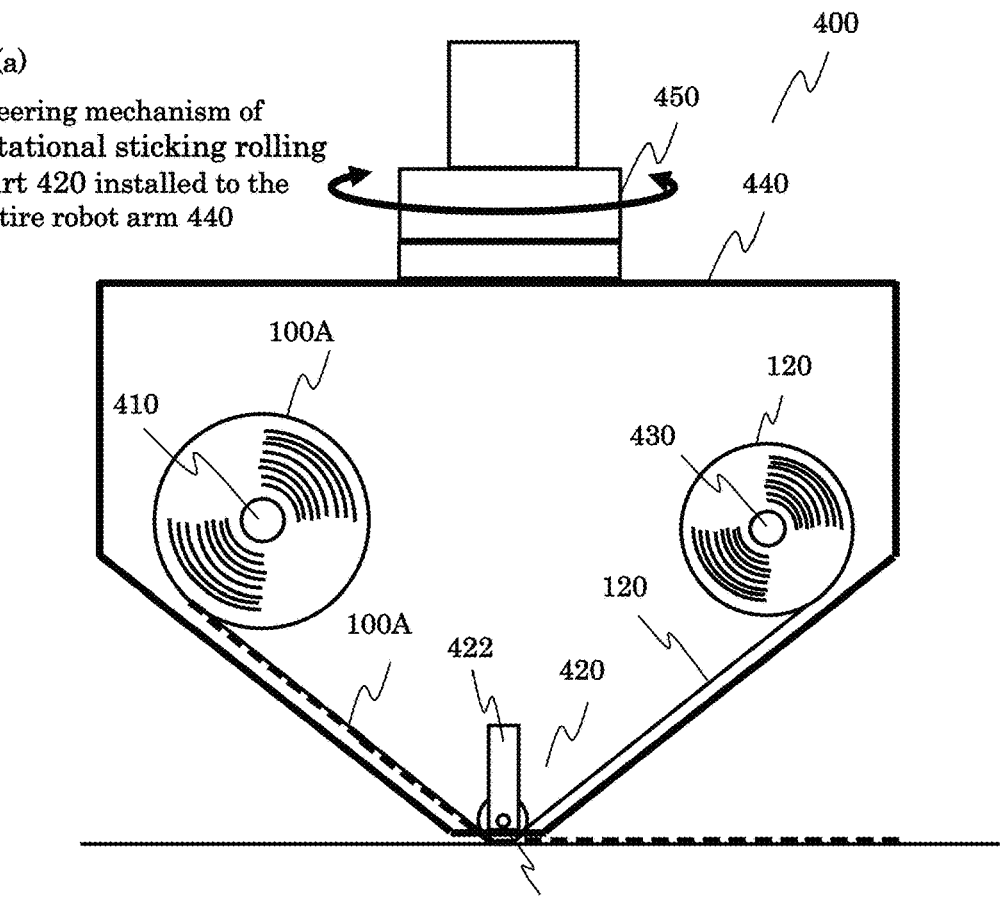
FIG. 9 (a)-(b) are schematic views is a schematic view showing a steering mechanism of the entire robot arm 440 of the improved half-cut double-sided tape sticking device 400 of the half-cut double-sided tape 100A.
Figure 9:
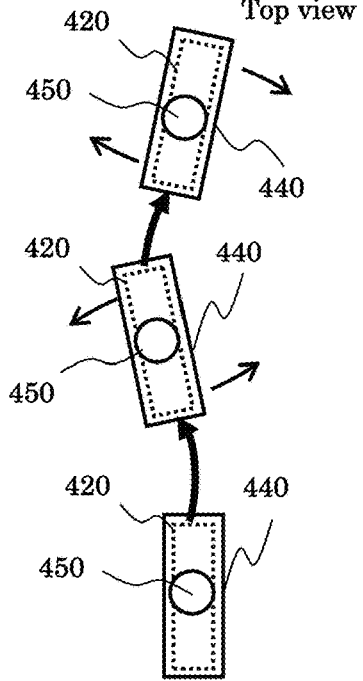

In FIG. 9, the "steering motion mechanism" is incorporated in a robot arm supporting the whole half-cut double-sided tape sticking device 400 to change the angle in the horizontal plane by moving the whole half-cut double-sided tape sticking device 400. In the example of FIG. 9, the improved sticking device 400 is installed on the head 440 of the robot arm, and the whole head 440 is rotatable in a horizontal plane by the steering mechanism 450, and the sticking direction can be actively controlled in the curved direction.

The rotating body 421 of the rotary sticking rolling part 420 may be a single rotating body and may be a pair of right and left rotating bodies.

Thus, both a so-called "steering motion" for changing an angle in the horizontal plane as shown in FIG. 8 (b) or FIG. 9 and a so-called "suspension motion" as shown in FIG. 8 (c) are installed, so that a so-called curve and vertical movement can be made between the rotary sticking rolling part 420 and the surface of the sticking object place. A curve and three-dimensional route can be possible by following even if the sticking object part is a curved surface having irregularities, like a tire track of the vehicle.

Next, an example of the stuck track of the half-cut double-sided tape A manufactured by the method for manufacturing the half-cut double-sided tape according to the present invention are shown.

Each piece of the half-cut double-sided tape manufactured by the method for manufacturing the half-cut double-sided tape can be stuck to the sticking object place in the independent state, so that the half-cut double-sided tape can be stuck so as to draw a curve as a whole when the double-sided tape pieces are peeled from the release liner 120.

Figure 10:
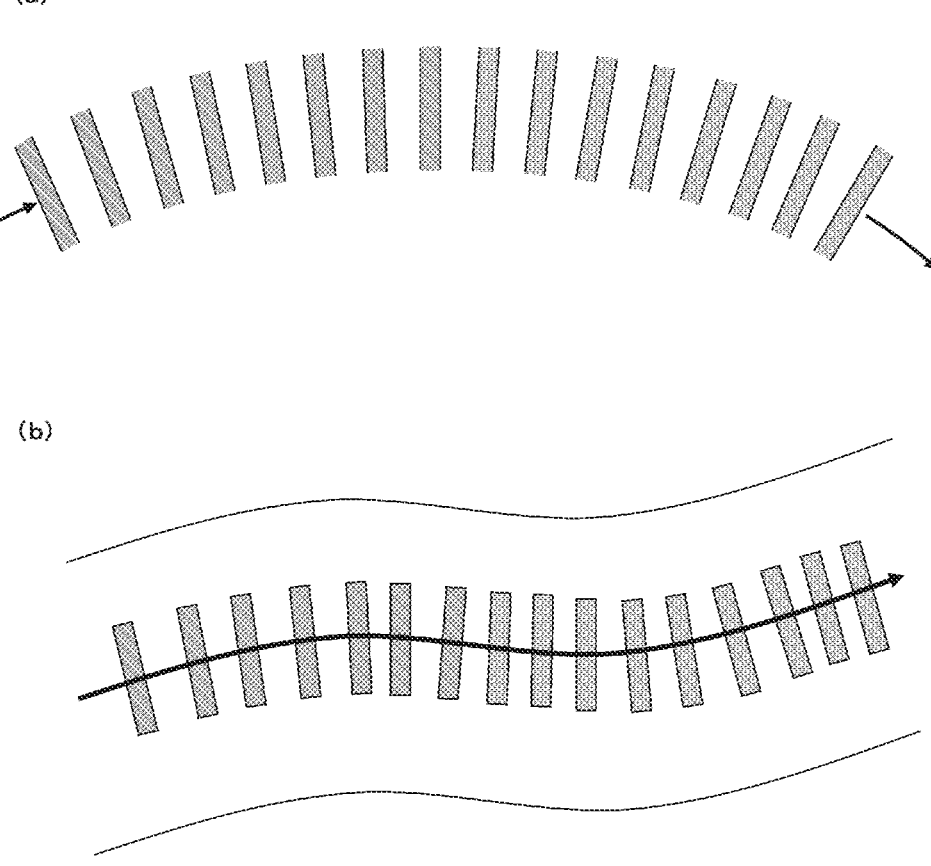
FIG. 10 (a)-(b) are schematic views showing sticking track in which a curved line and a vertical movement are applied in the half-cut double-sided tape 100A.

FIG. 10 is a schematic view showing sticking track in which a curved line and a vertical movement are applied in a sticking track of the half-cut double-sided tape A.

In practice, since the cutting edge of the half-cut process-ing machine is sharp, the interval between small pieces of the strip-shaped double-sided tape on the release liner 120 is small, but here, the shape of each small piece of the strip-shaped double-sided tape and the sticking track are simply indicated by increasing the interval so as to be easy to understand.

FIG. 10 (*a*) is a view simply showing a state in which the half-cut double-sided tape A is stuck along an arc-shaped curve on the surface of the planar object to be stuck. FIG. 10 (*b*) is a view simply showing a state in which the half-cut double-sided tape A is stuck along the curved surface on the surface of the three-dimensional curved object to be stuck. As described above, according to the improved sticking device 400 of FIG. 8, since a sticking track along a curved line or a curved surface can be drawn by the double-sided tape, the half-cut double-sided tape A can be stuck on the surface of various objects to be stuck. The use application of the double-sided tape may be expanded.

Next, a further improved sticking device 500 for sticking the half-cut double-sided tape 100A according to the present invention will be described. The improved sticking device 500 comprises the roll body attachment part 510, the rotary sticking rolling part 520, and the release liner winding part 530 in the same way as the above-shown sticking device 300, but it is further improved in an additional structure.

The rotary sticking rolling part 520 is provided with a non-rotary rolling body 523 which is non-rotatable member, in addition to the rotary body 521 at the rolling part.

In this example, the width of the rotating body 521 is smaller than the width of the half-cut double-sided tape 100A, and the non-rotating rolling body 523 is arranged so as to apply rolling pressure to the part of the half-cut double-sided tape 100A under the non-rotating rolling body 523 without being in contact with the rotating body 521.

Figure 11:
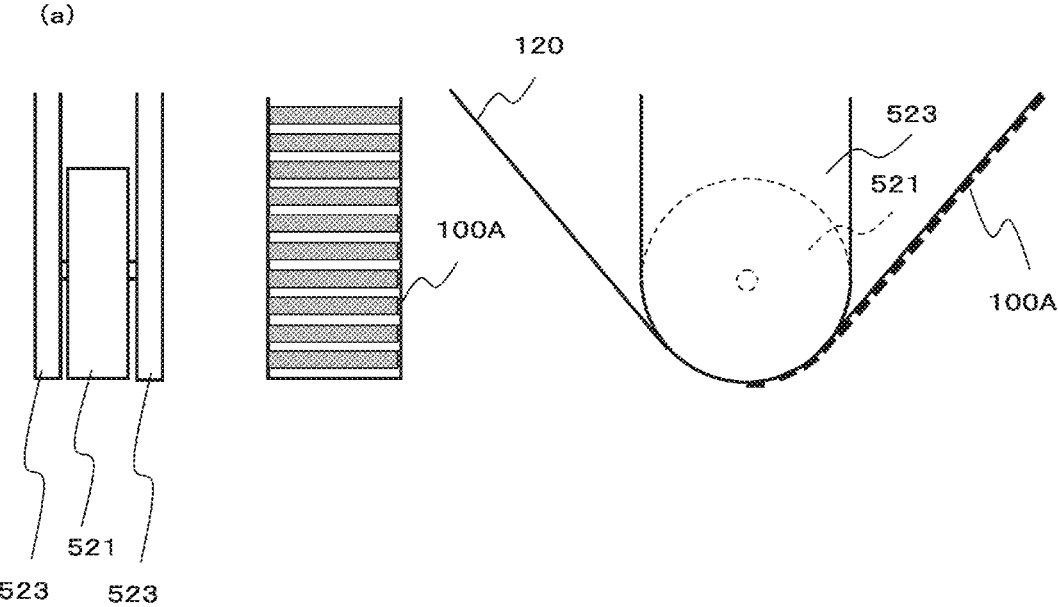
FIG. 11 (a)-(b) are schematic views showing an arrangement example of the rotating body 521 and the non-rotating rolling body 523 in the rotary sticking rolling part 520.
Figure 11:
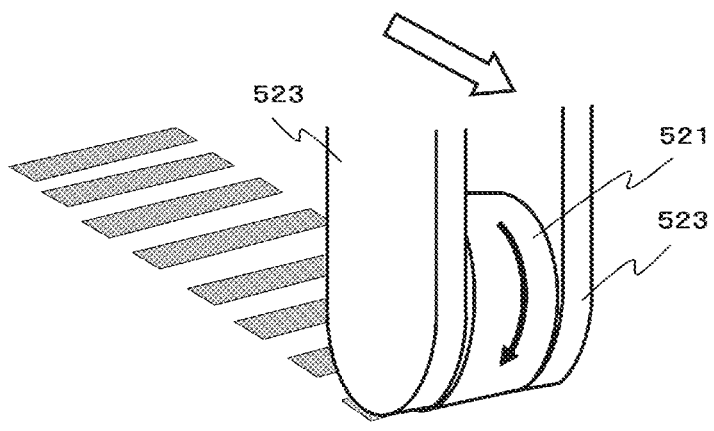

FIG. 11 is a schematic view showing an arrangement example of the rotating body 521 and the non-rotating rolling body 523 in the rotary sticking rolling part 520. Although FIG. 11 (*a*) shows a front view (the view from the advancing direction) and a side view, the half-cut double-sided tape 100A and the release liner 120 to be wound are not shown in the drawings. The drawing on the right side of the front view shows the half-cut double-sided tape 100A for understanding. In the side view, the half-cut double-sided tape 100A and the release liner 120 to be wound are simply shown.

The shape of the non-rotation rolling body 523 may be acceptable as long it can face the object to be stuck, but in this example, the shape is formed the same shape as that of the rotary body 521 so that the surface of the release liner 120 is rubbed smoothly. However, the non-rotation rolling body 523 cannot rotate.

In this example, as shown in FIG. 11 (*a*), the rotating body 521 is arranged near the center in the width direction of the half-cut double-sided tape 100A, and the non-rotating roll-ing body 523 is arranged at both ends in the width direction of the half-cut double-sided tape 100A.

The arrangement height of the non-rotation rolling body 523 is adjusted as the height of the rotary body 521 and the height of the contact surface of the non-rotation rolling body 523 to the release liner 120 of the half-cut double-sided tape 100*a* become substantially the same.

As shown in FIG. 11 (*b*), when the rotary sticking rolling part 520 of the improved sticking device 500 moves on the surface of the object to be stuck, the release liner 120 is smoothly pressed while the rotary body 521 is rotated, and the release liner 120 is pressed while the non-rotary rolling body 523 rubs without rotating. As a result, the half-cut double-sided tape 100A is shifted to the surface of the object to be stuck.

Since the rotating body 521 and the non-rotating rolling body 523 deliver the half-cut double-sided tape 100A while contacting the rear surface (the surface on the release liner 120 side), the driving force for delivering the half-cut double-sided tape 100A is sufficiently obtained, while the non-rotary rolling body 523 is arranged at both ends in the width direction of the half-cut double-sided tape 100A. Since both end parts of the half-cut double-sided tape 100A being the stuck strip-like small pieces are pressed so as to be firmly rubbed, the sticking state of the half-cut double-sided tape 100A can be neatly arranged without turning up or floating a part of the end side.

As a modification, the position of the rotating body 521 and the position of the non-rotating rolling body 523 in the advancing direction are made different, and the rotating body 521 can be advanced earlier than the non-rotating rolling body 523.

Figure 12:
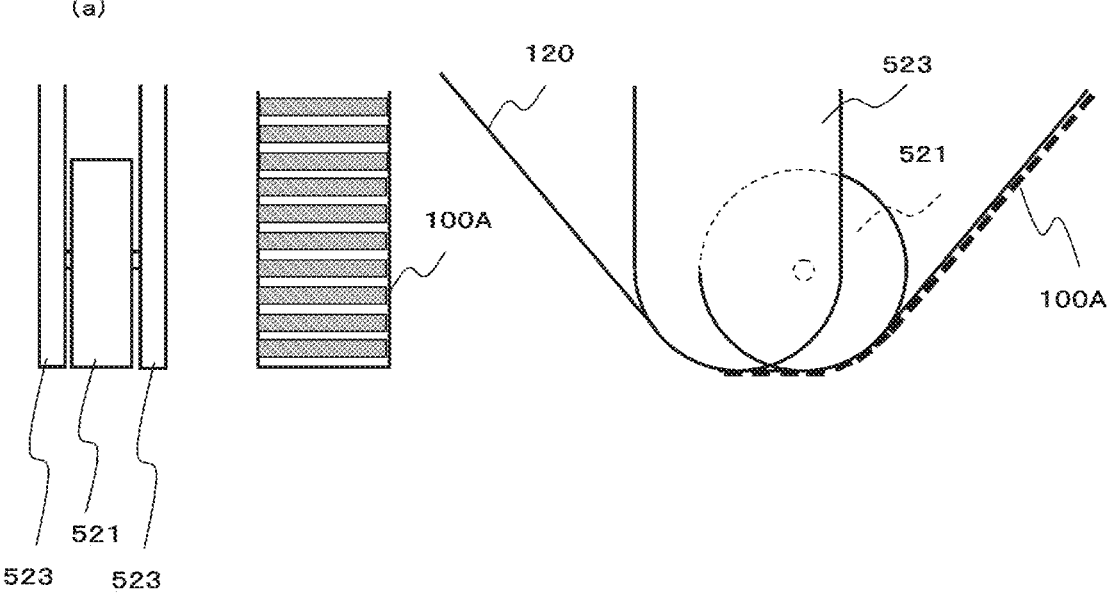
FIG. 12 (a)-(b) are schematic views showing a configuration example in which the rotating body 521 is arranged to advance earlier than the non-rotating rolling body 523.
Figure 12:
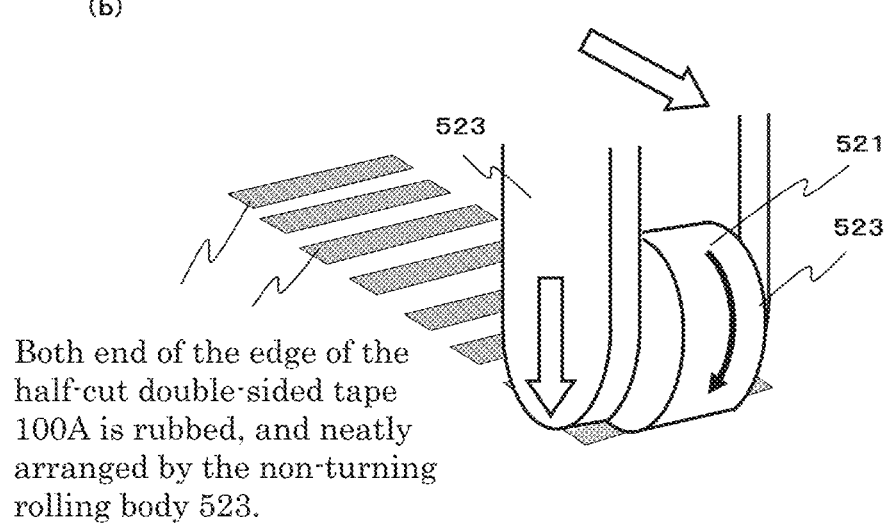

FIG. 12 is a schematic view showing a configuration example in which the rotating body 521 is arranged to advance earlier than the non-rotating rolling body 523. Although FIG. 12 (*a*) shows a front view (the view from the advancing direction) and a side view, the half-cut double-sided tape 100A and the release liner 120 to be wound are not shown in the drawings for easy understanding. The drawing on the right side of the front view shows the half-cut double-sided tape 100A. In the side view, the half-cut double-sided tape 100A and the release liner 120 to be wound are simply shown.

In the side view of FIG. 12 (*a*), the traveling direction is the right, and the rotating body 521 is arranged in advance to the non-turning rolling body 523. Similar to FIG. 11, the rotating body 523 is arranged at the center in the width direction of the half-cut double-sided tape 100A, and the non-turning rolling body 523 is arranged at both ends in the width direction of the half-cut double-sided tape 100A.

As shown in FIG. 12 (*b*), when the rotary sticking rolling part 520 of the improved sticking device 500 moves on the surface of the object to be stuck, the release liner 120 is smoothly pressed while the rotary body 521 is rotated, and the release liner 120 is pressed while the non-rotary rolling body 523 rubs without rotating, and the half-cut double-sided tape 100A is shifted to the surface of the object to be stuck.

In the configuration of FIG. 12, the rotating body 521 and the non-rotating rolling body 523 deliver the half-cut double-sided tape 100A while contacting the rear surface (the surface on the release liner 120 side). Since the rotating body 521 is arranged near the center in the width direction of the half-cut double-sided tape 100A, the driving force for delivering the half-cut double-sided tape 100A is sufficiently obtained. As shown in FIG. 12 (*b*), since both sides parts in width of the rotating body 521 are not pressed by the rotating body 521 directly, both sides part of the half-cut double-sided tape 100A are only lightly adhered to the surface of the object to be stuck. However, the non-turning rolling body 523 is arranged at both ends in the width direction of the half-cut double-sided tape 100A, both end parts of the half-cut double-sided tape 100A are pressed and firmly rubbed immediately after being stuck. The sticking state of the half-cut double-sided tape 100A can be neatly arranged without turning up or floating a part of the end side.

Further, as a further modification, a configuration including the smoothing roller 524 for rolling and moving on the stuck half-cut double-sided tape and smoothing the sticking state can be provided.

Figure 13:
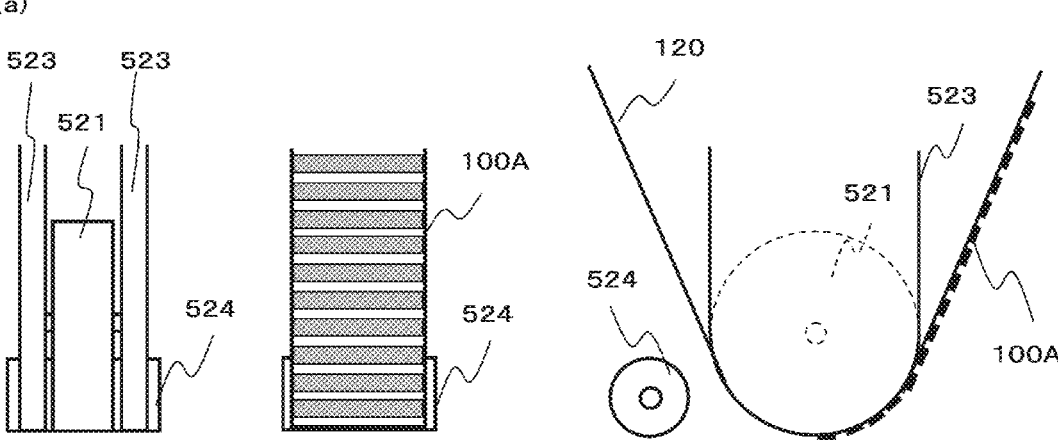
FIG. 13 (a)-(b) are schematic views showing a configuration example including a smoothing roller 524.
Figure 13:
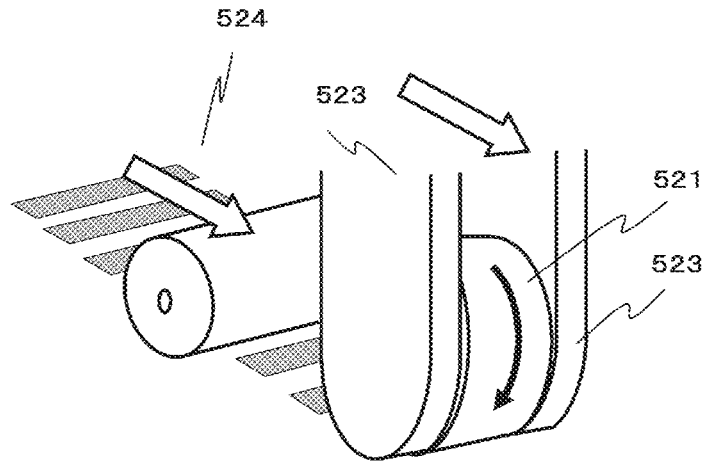
Figure 14:
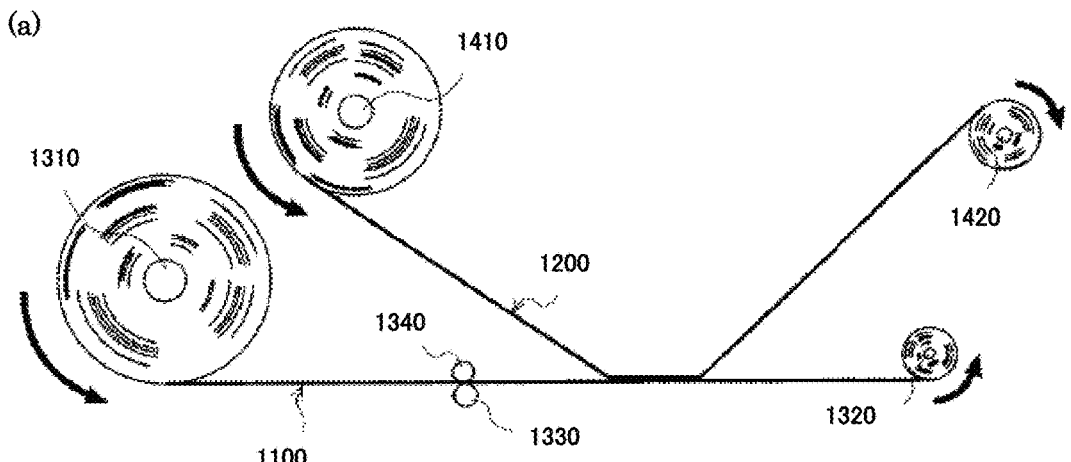
FIG. 14 (a)-(c) are schematic views showing a conventional process of a method for manufacturing a half-cut double-sided tape disclosed in JP 2016-008262 in the prior art.
Figure 14:
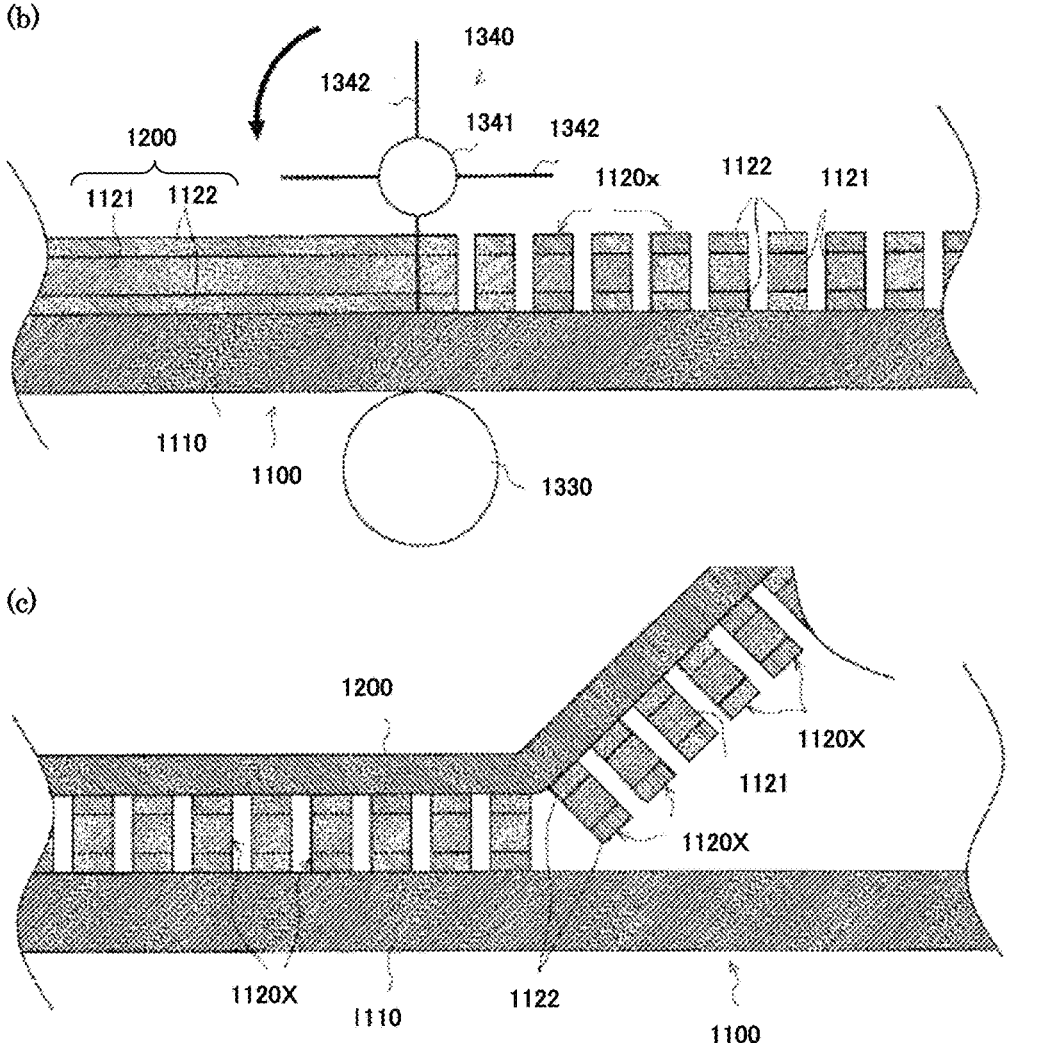

FIG. 13 is a schematic view showing a configuration example including a smoothing roller 524. Although FIG. 13 (*a*) shows a front view (the view from the advancing direction) and a side view, the half-cut double-sided tape 100A and the release liner 120 to be wound are not shown in the drawings for easy understanding. The drawing on the right side of the front view shows the half-cut double-sided tape 100A for understanding. The smoothing roller 524 is not shown in both drawings, but the smoothing roller 524 has a roller shape. In the side view, the half-cut double-sided tape 100A and the release liner 120 to be wound are simply shown. The smoothing roller 524 is shown as the roller shape member simply and other members such as rotary shaft are not shown.

In this example, as shown in FIG. 13 (*a*), the rotating body 521 is arranged in the vicinity of the center in the width direction of the half-cut double-sided tape 100A, and the non-rotating rolling body 523 is arranged at both ends in the width direction of the half-cut double-sided tape 100A, and the smoothing roller 524 is arranged at the rear thereof.

The smoothing roller 524 has a rotatable structure. The smoothing roller 524 is supported by a support member (not shown) and can apply a pressing force downward to press the half-cut double-sided tape 100A immediately after sticking.

By providing the smoothing roller 524 behind the rotating body 521, the sticking state of the stuck half-cut double-sided tape small piece can be smoothed, and the sticking state can be neatly arranged. In this example, as shown in FIG. 13, the smoothing roller 524 is arranged as a part or a separate body of the rotary sticking rolling part 520.

As shown in FIG. 13 (*b*), the smoothing roller 524 goes along the surface of the object to be stuck by following the rotation sticking rolling part 520 of the improvement type sticking device 500, and rolls over the half-cut double-sided tape which has been stuck, so that the sticking state is adjusted and smoothed.

Since the smoothing roller 524 advances while going along the upper surface of the half-cut double-sided tape 100A which shape is a strip-like small piece immediately after sticking, the surface of the smoothing roller 524 is preferably treated with a release material such as a silicone resin in the same manner as the release liner or the like. In addition, since the adhesive property of the half-cut double-sided tape 100A should be kept and not be lost, it is preferable to perform such surface processing to prevent the release agent from shifting to the stuck half-cut double-sided tape surface.

While some preferable embodiments of the method of manufacturing the half-cut double-sided tape and the half-cut double-sided tape sticking device according to the present invention are described above, it should be understood that various changes are possible, without deviating from the technical scope according to the present invention.

INDUSTRIAL APPLICABILITY

A method for manufacturing a half cut double-sided tape according to the present invention can be widely applied as a method for manufacturing a half-cut double-sided tape regardless of the type of an adhesive layer, the width of a tape, the diameter of a roll, and the like

DESCRIPTION OF THE REFERENCE NUMERALS

100 Double-sided tape with the release liner
100A half-cut double-sided tape with the release liner
131 Width-direction cutting region
132 Width-direction non-cut region
110 Double-sided tape
111 Base material layer
112 Adhesive layers
113 Adhesive layers
120 Release liner
130 Protect release paper tape
200 Mount equipped shrink film package
210 Feed reel
220 winding reel
230 Feed reel
240 winding reel
300 Half-cut double-sided tape sticking device
310 Roll body attachment part
320 Rotary sticking rolling part
330 Release liner winding part
400 Half-cut double-sided tape sticking device
410 Roll body attachment part
420 Rotary sticking rolling part
421 Rotating body
422 Supporting mechanism
430 Release liner winding part
500 Half-cut double-sided tape sticking device
510 Roll body attachment part
520 Rotary sticking rolling part
521 Rotating body
522 Supporting mechanism
523 Non-rotary rolling body
530 Release liner winding part

I claim:

1. A half-cut double-sided tape sticking device configured for sticking a half-cut double-sided tape with a release liner, the half-cut double-sided tape being provided in a half-cut state with a large number of small pieces and the release liner covering one surface of the half-cut double-sided tape, the device comprising:

a roll body reel that rotatably supports a roll-shaped half-cut double-sided tape with a release liner;

a rotary top through which the fed half-cut double-sided tape with the release liner passes; and a release liner winder on which the release liner is wound, wherein the supporting shaft is provided with a rotating body and a supporting shaft rotatably supporting the rotating body, wherein the supporting shaft is provided with a suspension for the rotary top;

wherein the roll body reel attachment part or the release liner winder comprises an automatic rotation controller configured for controlling the rotation of the half-cut double-sided tape with the release liner, the device is configured so that, at a start period of the sticking stroke, the start of the rotation by the rotation control and the movement of the shift from the separation height to the sticking height are correlated by the sticking control of the suspension, and at an end period of the sticking stroke, the stop of the rotation by the rotation control and the movement of the shift from the contact height to the separation height are correlated by sticking control of the suspension.

2. The half-cut double-sided tape sticking device according to claim 1, wherein the suspension is configured to perform a sticking control for switching the height of the rotating body between a contact height at which the half-cut double-sided tape with the release liner sticks on an object place and a separation height separated from the object place.

3. The half-cut double-sided tape sticking device according to claim 2, wherein for the sticking control by the suspension, a change from the contact height to the separation height is any one of a vertical upward direction, a front oblique upper direction of the stuck half-cut double-sided tape, and a rear oblique upper direction of the stuck half-cut double-sided tape.

4. The half-cut double-sided tape sticking device according to claim 1, wherein the automatic rotation control mechanism is only installed in the release liner winder, and the release liner winder controls the rotation of the half-cut double-sided tape with the release liner, at a start period of the sticking stroke, the start of the rotation by the rotation control of the release liner winder and the movement of the shift from the separation height to the sticking height are correlated by the sticking control of the suspension, and at an end period of the sticking stroke, the stop of the rotation by the rotation control of the release liner winder and the movement of the shift from the contact height to the separation height are correlated by sticking control of the suspension.

5. The half-cut double-sided tape sticking device according to claim 1, comprising a suspension motion mechanism that follows the unevenness of the body to be stuck for maintaining the stick height of the rotating body in the suspension of the supporting shaft.

6. The half-cut double-sided tape sticking device according to claim 5, wherein the suspension motion mechanism is elastic provided with the rotating body.

7. The half-cut double-sided tape sticking device according to claim 5, wherein the suspension motion mechanism is configured for moving up and down provided by the supporting shaft.

8. The half-cut double-sided tape sticking device according to claim 1, further comprising a steering motion mechanism for changing an angle in a horizontal plane of the rotating body.

9. The half-cut double-sided tape sticking device according to claim 8, wherein the steering motion mechanism is incorporated with the supporting shaft or is incorporated with a robot arm supporting the entire half-cut double-sided tape sticking device to change an angle within a horizontal plane of the entire half-cut double-sided tape sticking device.

10. The half-cut double-sided tape sticking device according to claim 1 wherein the rotating body of the rotary top is a single rotating body or a pair of right and left rotating bodies.

11. The half-cut double-sided tape sticking device according to claim 1 wherein the width of the rotating body is smaller than the width of the half-cut double-sided tape, and the non-rotating rolling body is installed to apply a pressure to a part of the half-cut double-sided tape where the rotating body is not contacted.

12. The half-cut double-sided tape sticking device according to claim 11, wherein the height of the rotating body and the non-rotating rolling body is substantially the same, wherein the rotating body is arranged in the vicinity of the center in the width direction of the half-cut double-sided tape, and wherein the non-rotation rolling body is arranged at both ends in the width direction of the half-cut double-sided tape.

13. The half-cut double-sided tape sticking device according to claim 1, comprising a smoothing roller behind the rotary top, which rolls over and moves on the stuck half-cut double-sided tape and smooths the stuck state.

\* \* \* \* \*